(12) United States Patent
Yokota et al.

(10) Patent No.: US 6,951,349 B2
(45) Date of Patent: Oct. 4, 2005

(54) COVER FOR AIR BAG DEVICE

(75) Inventors: Keishi Yokota, Tokyo (JP); Tadahiro Igawa, Tokyo (JP); Ichizo Kobayashi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/750,944

(22) Filed: Jan. 5, 2004

(65) Prior Publication Data

US 2004/0140651 A1 Jul. 22, 2004

Related U.S. Application Data

(62) Division of application No. 09/731,988, filed on Dec. 8, 2000, now Pat. No. 6,692,016.
(60) Provisional application No. 60/185,743, filed on Feb. 29, 2000.

(51) Int. Cl.$^7$ ............................................... B60R 21/16
(52) U.S. Cl. ............................. 280/728.2; 280/728.3; 280/731
(58) Field of Search ..................... 280/728.2, 728.3, 280/731; 40/593; 29/513

(56) References Cited

U.S. PATENT DOCUMENTS

| 5,403,034 A | 4/1995 | Gans et al. | |
|---|---|---|---|
| 5,415,428 A | 5/1995 | Koide et al. | |
| 5,678,851 A | 10/1997 | Saito et al. | |
| 5,741,024 A | 4/1998 | Enders | |
| 5,887,892 A | * 3/1999 | Burdack et al. | ............. 280/731 |
| 5,913,534 A | 6/1999 | Klingauf | |
| 6,003,895 A | 12/1999 | Niwa et al. | |
| 6,047,984 A | 4/2000 | Preisler et al. | |
| 6,053,526 A | * 4/2000 | Preisler et al. | ............ 280/728.2 |
| 6,105,999 A | 8/2000 | Johnson | |
| 6,158,764 A | 12/2000 | Preisler et al. | |
| 6,168,187 B1 | 1/2001 | Yamada et al. | |
| 6,322,100 B1 | * 11/2001 | Cuevas et al. | ............ 280/728.3 |
| 6,568,701 B1 | * 5/2003 | Burdack et al. | .......... 280/728.2 |
| 6,568,704 B2 | * 5/2003 | Iida et al. | ................. 280/728.3 |
| 6,692,016 B2 | * 2/2004 | Yokota et al. | ............ 280/728.2 |
| 6,695,344 B2 | * 2/2004 | Hauer | ......................... 280/731 |

FOREIGN PATENT DOCUMENTS

| DE | 29607536 | | 4/1995 |
|---|---|---|---|
| DE | 19925546 | | 7/2000 |
| JP | 3074270 | | 3/1991 |
| JP | 10-273004 | | 10/1998 |
| JP | 11-189119 | | 7/1999 |
| JP | 25547 | | 1/2000 |
| JP | 272458 | | 10/2000 |
| JP | 2001055107 A | * | 2/2001 |
| JP | 151063 | | 6/2001 |
| JP | 233140 | | 8/2001 |

* cited by examiner

*Primary Examiner*—Paul N. Dickson
*Assistant Examiner*—Toan C. To
(74) *Attorney, Agent, or Firm*—Foley & Lardner LLP

(57) ABSTRACT

A cover for an air bag device that enables an emblem to be secured to the cover in an extremely simple manner. The cover (module cover) has a recess for receiving the emblem. An extension of the emblem is extended through a hole in the cover. A distal end of the extension is bent along a rear side of the cover. A rib is pressed and welded by a thermal or ultrasonic welding element to form a welding body. The welding body covers the distal end of the extension.

9 Claims, 22 Drawing Sheets

COVER FOR AIR BAG DEVICE

CROSS-REFERENCE TO RELATED APPLICATIONS

This application is a divisional application of U.S. application Ser. No. 09/731,988, filed Dec. 8, 2000, now U.S. Pat. No. 6,692,016, and also claims the benefit of and priority to U.S. Provisional Patent Application Ser. No. 60/185,743 entitled "A Structure for Mounting an Emblem on a Steering Wheel", filed Feb. 29, 2000.

BACKGROUND OF THE INVENTION

The present invention relates to covers for air bag devices that protect passengers of high speed moving bodies, such as vehicles, and more particularly, to covers having an emblem. More specifically, the present invention relates to an improved structure for attaching the emblem in the cover.

Air bag devices, such as driver seat air bag devices and passenger seat air bag devices, are widely used to protect passengers from the impact produced during a vehicle collision. A driver seat air bag device is typically mounted on a boss of a steering wheel and includes a gas injecting inflator, an air bag, and a cover accommodating the air bag in a folded state. During collision of the vehicle, the gas injected from the inflator inflates the air bag. This ruptures the cover, which is made of a soft resin, and forms an opening in the cover. Accordingly, the air bag is inflated through the opening toward the vehicle's driver.

The air bag devices, particularly those for the drivers, often include a cover having an ornament plate, which is called an emblem. One known structure for attaching the emblem on the cover (for example, as described in Japanese Unexamined Patent Publication Nos. 10-273004 and 11-189119) includes a recess formed in a front side of the cover and a plurality of through holes each extending through a wall of the recess. The recess receives the emblem having a plurality of projections projecting rearward from the emblem. Each projection is extended through the associated through hole, and a distal end of the projection is bent along an inner side of the cover.

That is, in this structure, the projections of the emblem are first extended through the associated holes extending through the cover. Next, the distal ends of the projections are bent toward one another such that the distal ends are overlapped with one another. The overlapped portion of the projections are then riveted together to secure the emblem to the cover.

In this structure, in which the projections are extended through the holes, the projections are bent along the inner side of the cover, and the distal ends of the projections are riveted together, thus securing the emblem to the cover, the distal ends of the projections must be overlapped with one another accurately before riveting these ends. Since the distal ends are relatively small, the procedure is extremely complicated.

Accordingly, it is an objective of the present invention to provide a cover for an air bag device that facilitates the connection of the emblem to the cover.

Further, in the above emblem attaching structure, the projections may become loose in the holes, causing the emblem to become loose from the cover.

Thus, it is another objective of the present invention to provide a cover for an air bag device that securely connects an emblem to the cover and prevents loosening of the cover.

SUMMARY OF THE INVENTION

A cover for an air bag device according to the present invention includes an emblem attached to an outer side of the air bag device, wherein the emblem includes a main plate arranged on an outer side of the cover and a connecting extension projecting from an outer periphery of the main plate in a rearward direction of the emblem, and the extension is extended through a hole extending through the cover and a distal end of the extension is bent. The cover is configured so that the distal end of the extension is secured to the cover by means of a welding body.

In the cover for the air bag device, after the extension is extended through the hole of the cover and is bent, the extension is fixed by means of welding. This secures the emblem to the cover. This facilitates attachment of the emblem to the cover. Further, the extension is covered by the welding body to prevent the extension from directly contacting the emblem. In addition, since the extension is fixed by the welding body, the emblem is prevented from becoming loose.

A cover for an air bag device according to the present invention is a cover for an air bag device having an emblem attached to an outer side of the air bag device, wherein the emblem includes a main plate arranged on an outer side of the cover and a connecting extension projecting from an outer periphery of the main plate in a rearward direction of the emblem, and the extension is extended through a hole extending through the cover and a distal end of the extension is bent. The cover is characterized in that a projection or a modified portion is provided in a portion of the extension received in the hole, and the projection or the modified portion is pressed against a wall of the hole.

In the cover for the air bag device, the extension closely contacts the wall of the hole to prevent the emblem from becoming loose.

A cover for an air bag device according to the present invention is a cover for an air bag device having an emblem attached to an outer side of the air bag device, wherein the emblem includes a main plate arranged on an outer side of the cover and a connecting extension projecting from an outer periphery of the main plate in a rearward direction of the emblem, and the extension is extended through a hole extending through the cover and a distal end of the extension is bent. The cover is characterized in that the extension is shaped as a thin plate, the hole is shaped as a slit, a longitudinal direction of the slit-like hole extends diagonally with respect to a width direction of the thin plate-like extension, and opposite ends of the extension in the width direction are pressed against corners of a wall of the hole.

In the cover for the air bag device, the opposite ends of the extension closely contact the corners of the wall of the hole, thus preventing the emblem from becoming loose.

A cover for an air bag device according to the present invention is a cover for an air bag device having an emblem attached to an outer side of the air bag device, wherein the emblem includes a main plate arranged on an outer side of the cover and a connecting extension projecting from an outer periphery of the main plate in a rearward direction of the emblem, and the extension is extended through a hole extending through the cover and a distal end of the extension is bent. The cover is characterized in that the extension is shaped as a thin plate, the hole is shaped as a slit, an opening dimension of the slit-like hole in a lateral direction is smaller than a thickness of the extension when the extension is not extended through the hole, and the extension is clamped by a wall of the hole.

In the cover for the air bag device, the extension is clamped by the slit-like hole and is thus prevented from moving in the hole. This prevents the emblem from becoming loose.

A cover for an air bag device according to the present invention is a cover for an air bag device having an emblem attached to an outer side of the air bag device, wherein the emblem includes a main plate arranged on an outer side of the cover and a connecting extension projecting from an outer periphery of the main plate in a rearward direction of the emblem, and the extension is extended through a hole extending through the cover and a distal end of the extension is bent. The cover is characterized in that the hole is shaped as a slit, and sides of the extension are pressed against longitudinal ends of the hole.

In the cover for the air bag device, the sides of the extension are pressed against the ends of the hole, thus preventing the emblem from becoming loose.

A cover for an air bag device according to the present invention is a cover for an air bag device having an emblem attached to an outer side of the air bag device, wherein the emblem includes a main plate arranged on an outer side of the cover and a connecting extension projecting from an outer periphery of the main plate in a rearward direction of the emblem, and the extension is extended through a hole extending through the cover and a distal end of the extension is bent. The cover is characterized in that a projection abutting against a rear side of the emblem in the vicinity of the extension is formed integrally with the cover.

In the cover for the air bag device, a front side portion of the emblem near the extension is prevented from being bent together with the extension when the extension is bent. Accordingly, the appearance of the emblem attached to the cover is enhanced.

A cover for an air bag device according to the present invention is a cover for an air bag device having an emblem attached to an outer side of the air bag device, wherein the emblem includes a main plate arranged on an outer side of the cover and a connecting extension projecting from an outer periphery of the main plate in a rearward direction of the emblem, and the extension is extended through a hole extending through the cover and a distal end of the extension is bent. The cover is characterized in that an extended portion or a bent portion is provided in the extension for engaging with an edge of the hole at a rear side of the cover.

In the cover for the air bag device, the extension having the extended portion is extended through the hole such that the extension is not separated from the hole. This improves the work efficiency for attaching the emblem on the cover.

In this case, if a projection abutting against a front side of the cover projects from an outer periphery of the cover, the emblem is reliably prevented from becoming loose in a direction perpendicular to the front side of the cover (attaching direction).

A cover for an air bag device according to the present invention is a cover for an air bag device having an emblem attached to an outer side of the air bag device, wherein the emblem includes a main plate arranged on an outer side of the cover and a connecting extension projecting from an outer periphery of the main plate in a rearward direction of the emblem, and the extension is extended through a hole extending through the cover and a distal end of the extension is bent. The cover is characterized in that an engaging portion with which the bent distal end of the extension engages is provided on a rear side of the cover.

In the cover for the air bag device, the extension is secured by bending the extension to engage the extension with the engaging portion. Afterwards, the extension may be secured by a welding body.

A cover for an air bag device according to the present invention is a cover for an air bag device having an emblem including a main plate and a plurality of tabs extending in different direction separating from the main plate, characterized in that an opening extends through the cover with the main plate fitted in the opening from the rear side of the cover, and the tab is embedded in the cover.

In the cover for the air bag device, the tab is embedded in the cover such that the emblem is reliably secured to the cover. It is to be understood that both the foregoing general description and the following detailed description are exemplary and explanatory only, and are not restrictive of the invention as claimed.

BRIEF DESCRIPTION OF THE DRAWINGS

These and other features, as aspects, and advantages of the present invention will become apparent from the following description, appended claims, and the accompanying exemplary embodiments shown in the drawings, which are briefly described below.

FIG. 6(*b*) is a cross-sectional view of the extension of FIG. 6(*a*) taken along line B—B.

FIG. 6(*c*) is a cross-sectional view of the extension of FIG. 6(*a*) taken along line B—B showing the extension installed in a cover.

FIG. 7(*b*) is a cross-sectional view of the extension of FIG. 7(*a*) taken along line B—B.

FIG. 7(*c*) is a cross-sectional view of the extension of FIG. 7(*a*) taken along line B—B showing the extension installed in a cover.

FIG. 8(*b*) is a cross-sectional view of the extension and cover of FIG. 8(*a*) taken along line B—B, showing the extension installed in the cover.

FIG. 10(*b*) is a cross-sectional view showing the emblem of FIG. 10(*a*) installed in a cover.

DETAILED DESCRIPTION OF THE PREFERRED EMBODIMENT

As described further below, the present invention secures an emblem to a cover firmly and easily. An embodiment of the present invention will now be described with reference to the accompanying drawings.

Figure 1:
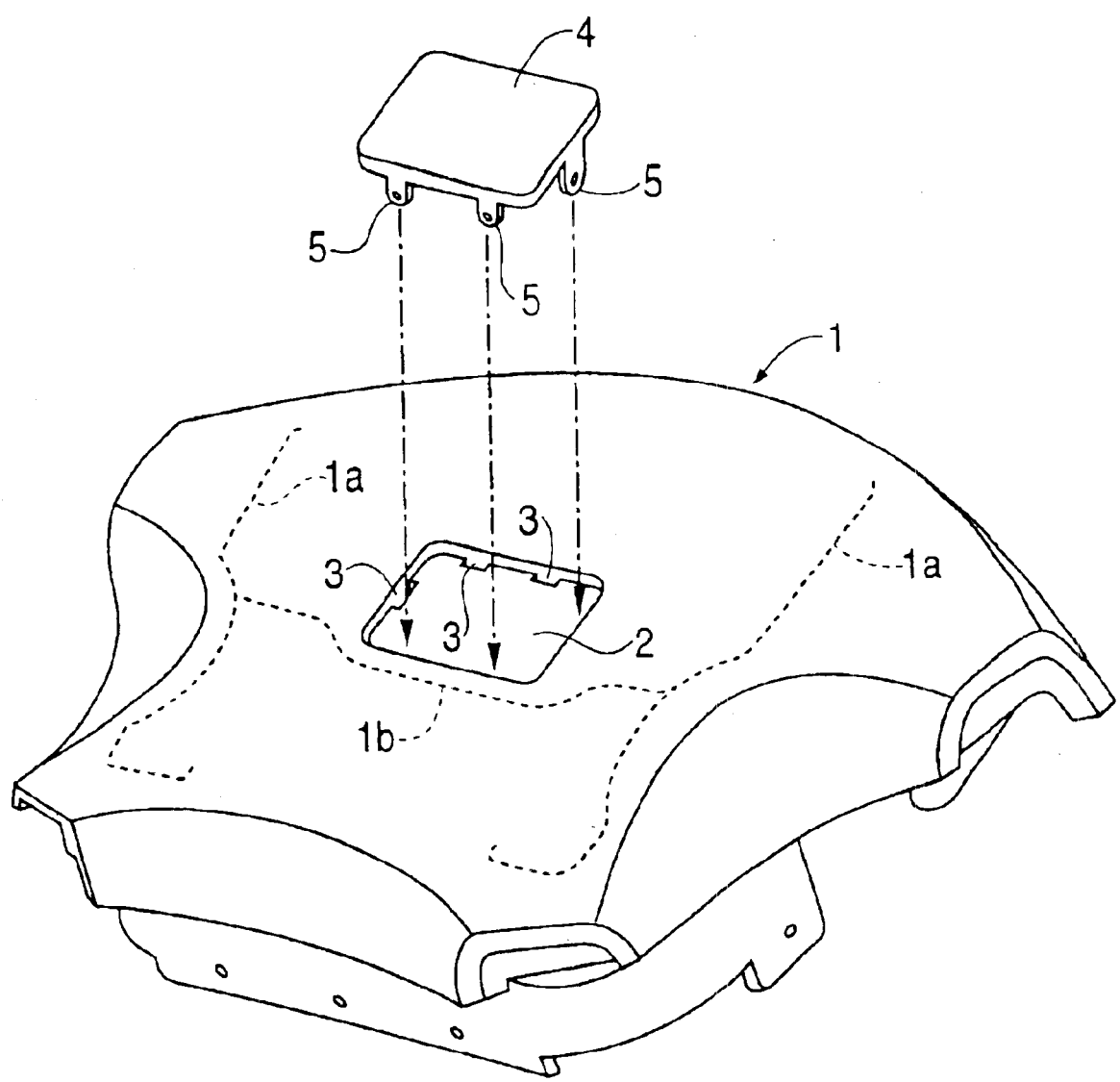
FIG. 1 is an exploded perspective view showing a cover for an airbag device having an emblem according to an embodiment of the present invention.

A cover 1 is a module cover for a driver seat air bag device and is located in the middle of a steering wheel facing the driver. The cover 1 is formed of, for example, thermoplastic synthetic resin through injection molding. As shown in FIG. 1, a pair of tearing lines 1a, 1b are formed in an inner side of the cover 1. When an air bag is inflated, the cover 1 is ruptured along the tearing lines 1a, 1b. A recess 2 is provided in a front side of the cover 1 for receiving an emblem 4.

As shown in FIG. 1, the emblem 4 may be substantially rectangular with the recess 2 having the same shape. However, it is obvious that the emblem 4 is not restricted to this shape. A plurality of holes 3 are provided along a side wall of the recess 2. The holes 3 extend through the cover 1, thus reaching a rear side of the cover 1. The emblem 4 has a plurality of extensions 5 that extend through the associated holes 3 when the emblem 4 is installed in the cover.

The emblem 4 includes a side wall formed by bending an entire periphery of the emblem 4 rearward (i.e., away from the driver) in a wall-like manner. The extensions 5 project rearward from a distal end (rear end) of the side wall.

Figure 2:
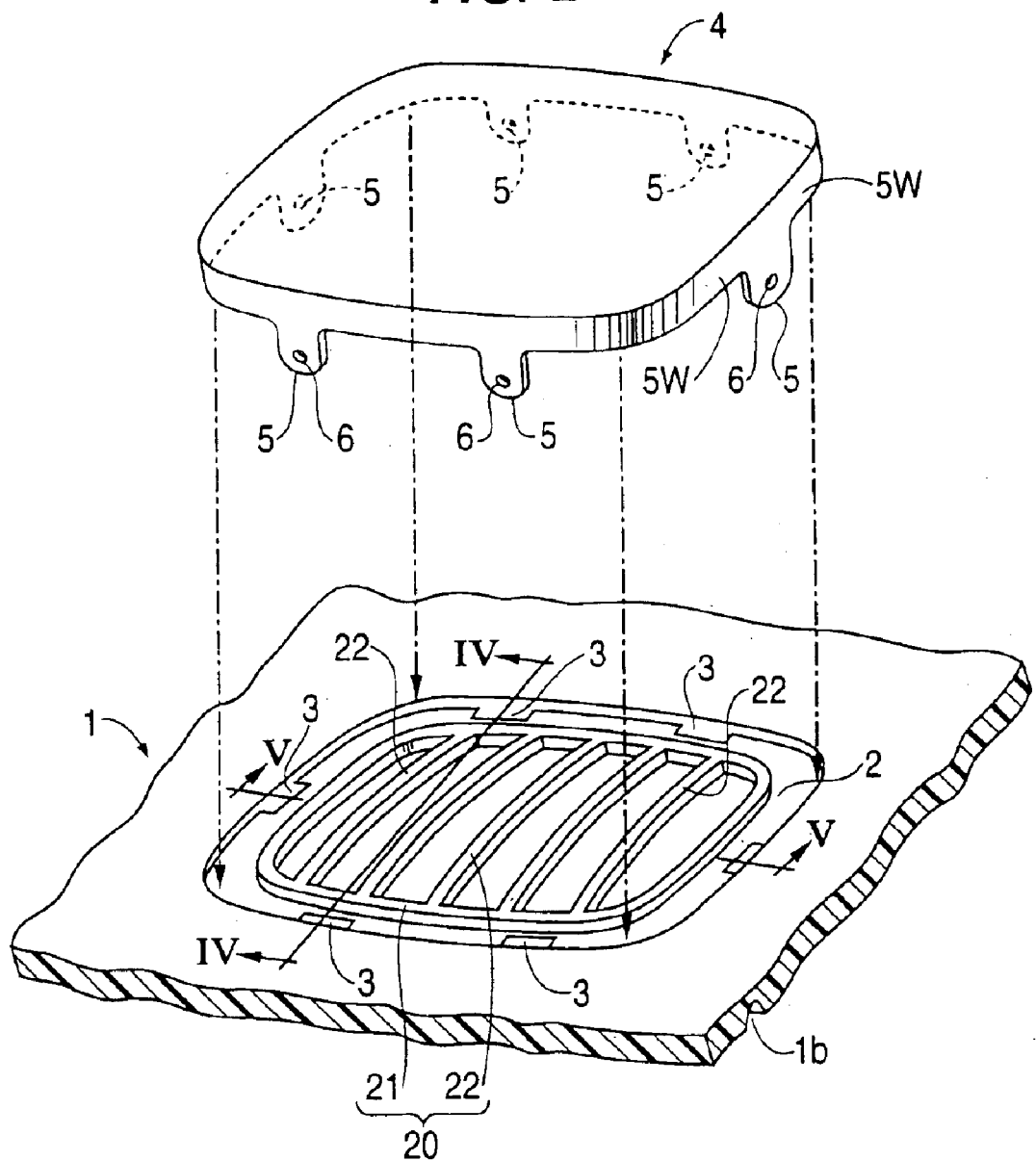
FIG. 2 is an enlarged exploded perspective view showing the emblem and the cover of FIG. 1.

As shown in FIG. 2, six extensions 5 and six holes 7 are provided. However, it is obvious that the number of the extensions 5 and the holes 6 are not restricted.

The emblem 4 may be formed from a metal plate of aluminum alloy or the like. Each extension 5 is formed as a tab-like piece formed from a thin plate. A hole 6 is formed in the extension 5.

Although omitted in FIG. 1 for the sake of brevity, a projection 20 shown in FIG. 2 may project from a bottom of the recess 2 of this embodiment. The projection 20 abuts against a rear side of the emblem 4 to support the emblem 4. The projection 20 includes a frame 21 and a plurality of rails 22. The frame 21 extends along the side wall of the recess 2. The rails 22 extend parallel with one another and are arranged within the frame 21.

Figure 3:
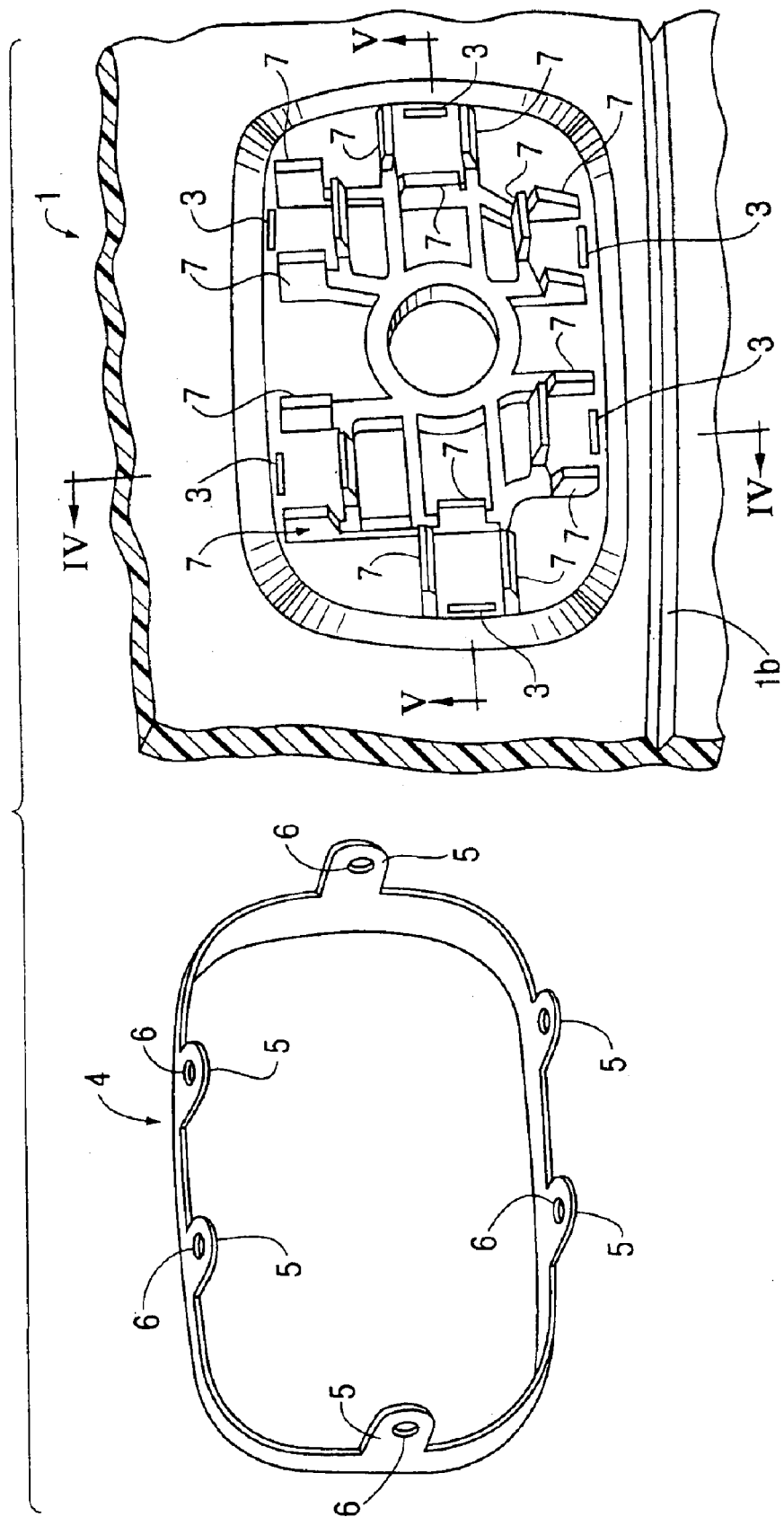
FIG. 3 is an exploded perspective view showing the emblem of FIG. 1 viewed from a rear side of the cover.

As shown in FIG. 3 a plurality of welding ribs 7 may be provided on the rear side of the cover 1 to surround each hole 3 on three sides. Alternatively, the number of the welding ribs 7 may be one, two, or four.

Figure 4:
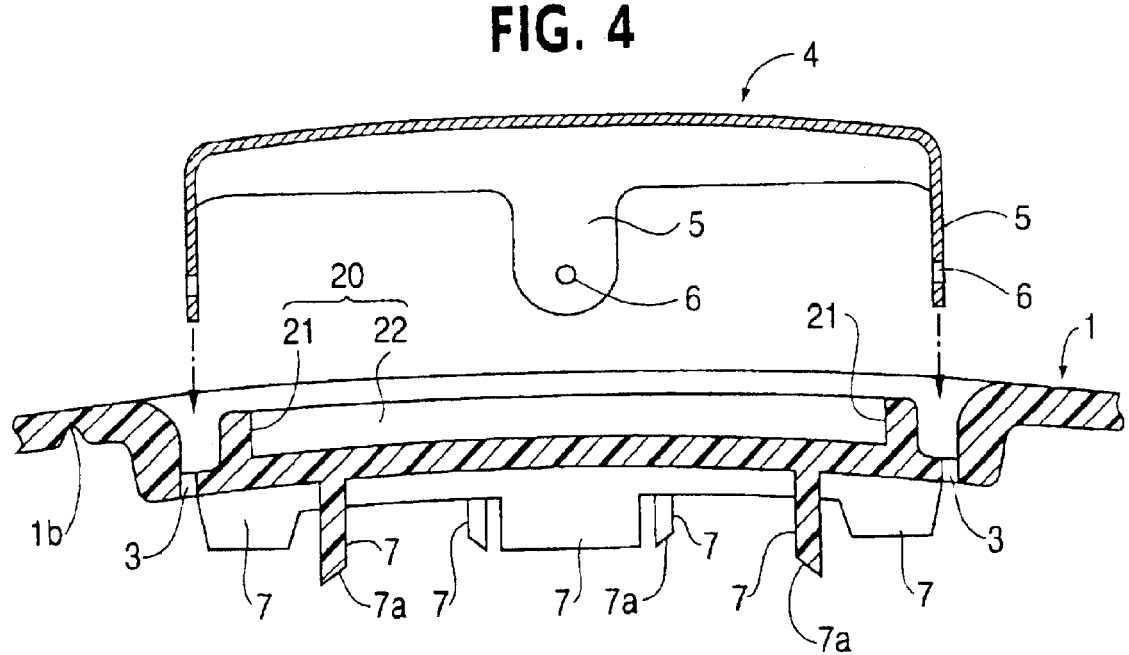
FIG. 4 is an cross-sectional view taken along line IV—IV of FIG. 3.
Figure 5A:
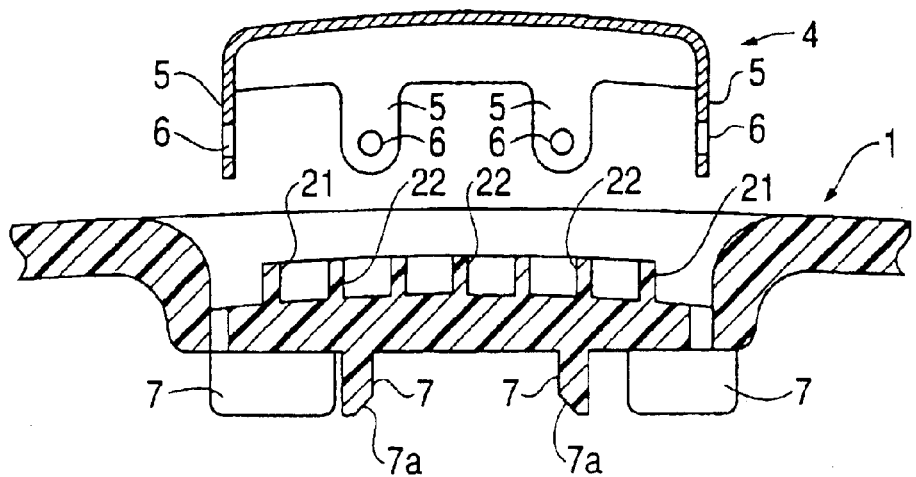
FIGS. 5(*a*), 5(*b*) and 5(*c*) are cross-sectional views taken along line V—V of FIG. 3 showing a sequential procedure for attaching the emblem on the cover.
Figure 5B:
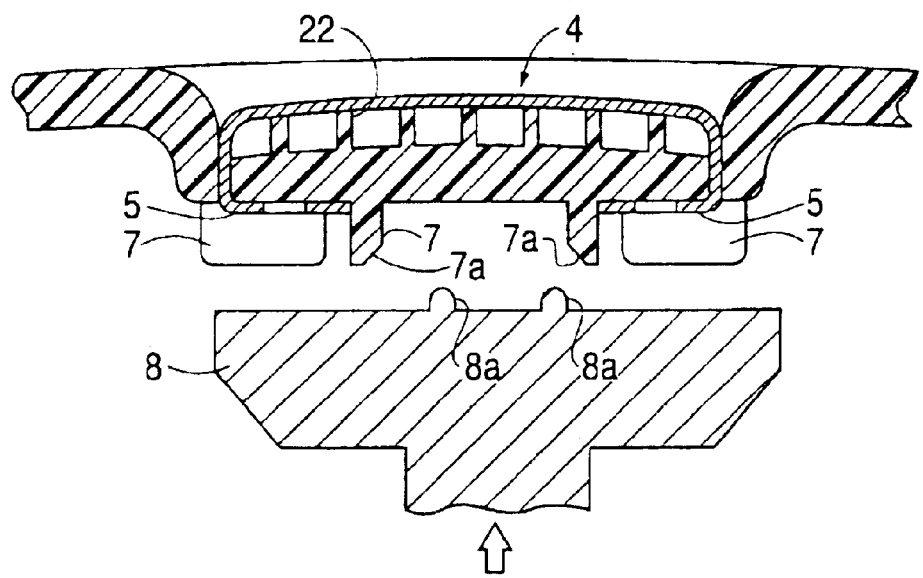

During assembly, the extensions 5 of the emblem 4 are first extended through the associated holes 3, as shown in FIGS. 4 and 5(a). Next, a distal end of each extension 5 is bent along the rear side of the cover 1, as shown in FIG. 5(b). Subsequently, a welding element 8 for thermal welding or ultrasonic welding is pressed against the ribs 7, thus bending the ribs 7 to cover the associated extensions 5. The ribs 7 are then subjected to thermal welding or ultrasonic welding. The bent distal end of each extension 5 is thus covered by the associated ribs 7. The ribs 7 are welded on the rear side of the cover 1.

Figure 5C:
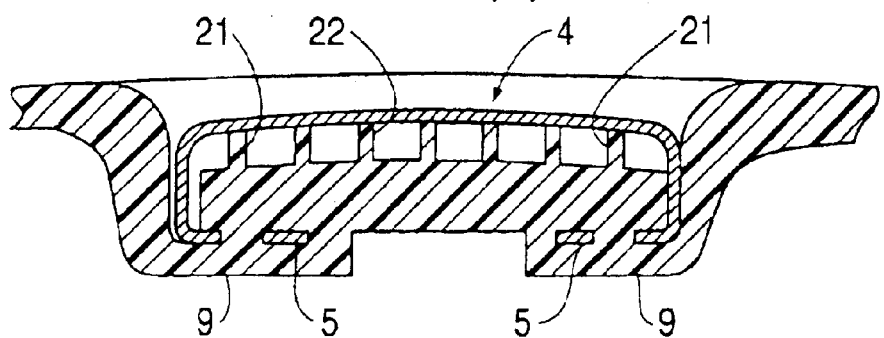

Accordingly, as shown in FIG. 5(c), a welded body 9 formed through the welding of the ribs 7 covers the distal ends of the extensions 5. The welded body 9 forms an integral body with the cover 1. This firmly secures the extensions 5 to the cover 1. Further, some of the welded body 9 enters the hole 6 of each extension 5 and integrates with the cover 1. This further rigidly secures the extensions 5 to the cover 1.

A slanted cut-away portion 7a is formed at a distal end of each rib 7, and the welding element 8 includes projections 8a. When the welding element 8 is pressed against the ribs 7, the projections 8a bend the associated cut-away portions 7a to overlap the extensions 5.

Figure 6A:
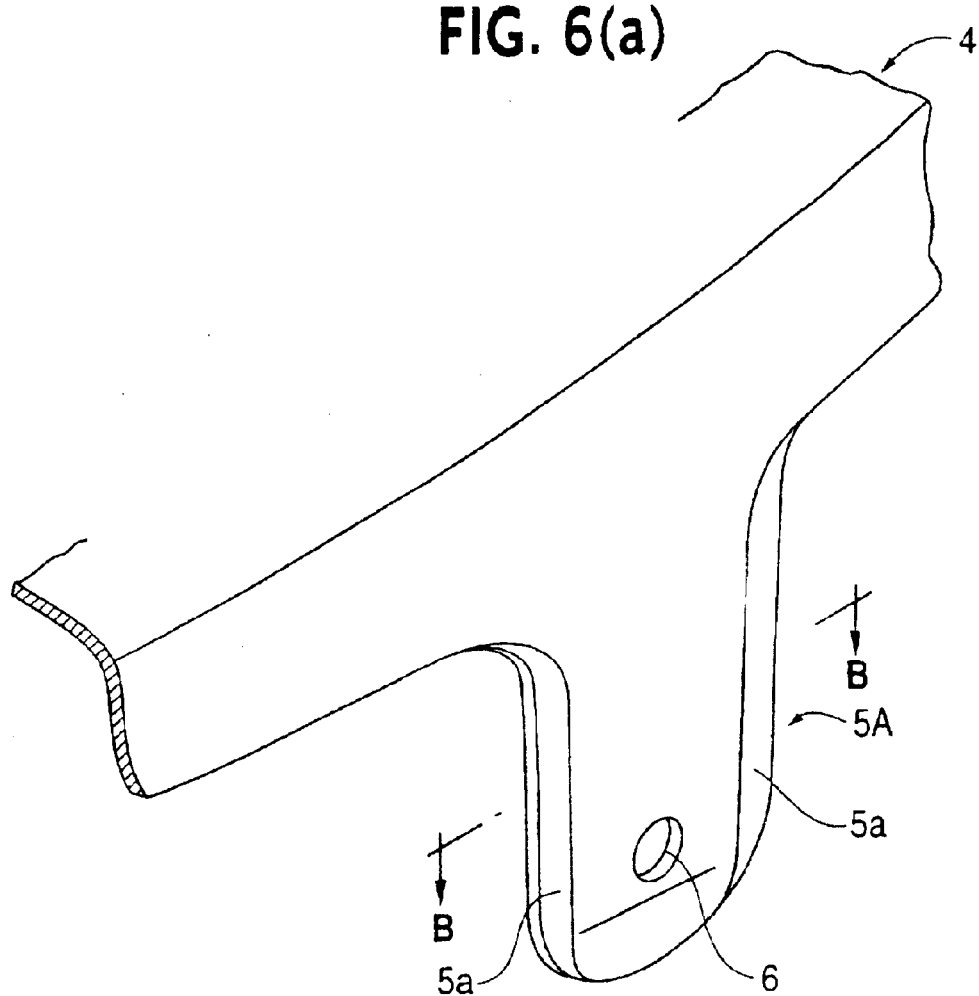
FIG. 6(*a*) is a perspective view showing an extension of an emblem according to an alternative embodiment of the present invention.
Figure 6B:
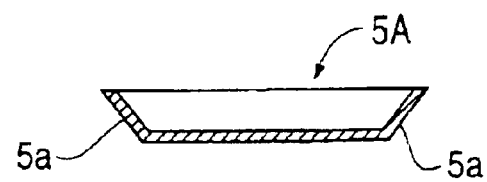
Figure 6C:
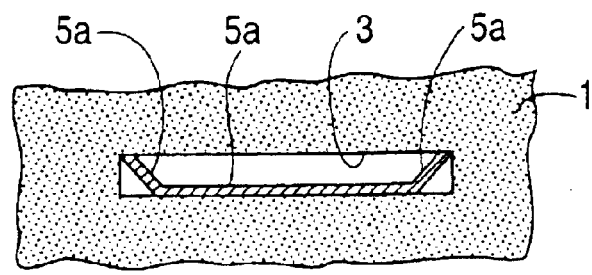
Figure 7A:
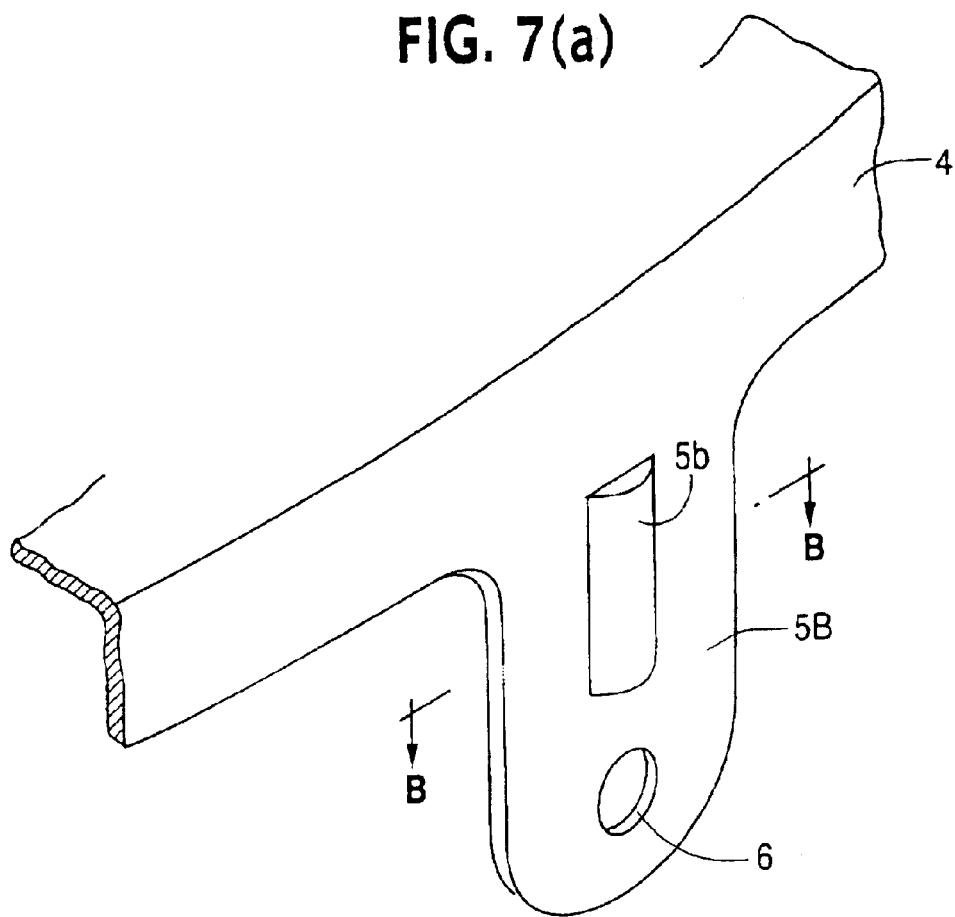
FIG. 7(*a*) is a perspective view showing an extension of an emblem according to an alternative embodiment of the present invention.
Figure 7B:
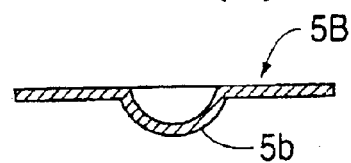
Figure 7C:
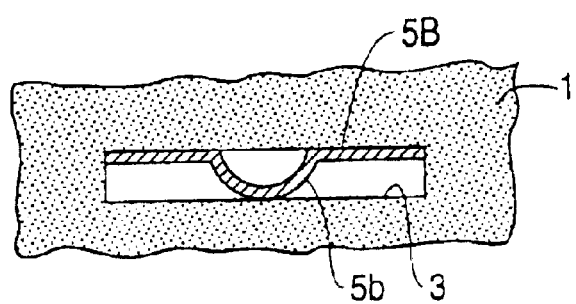

As shown in FIGS. 6–8, the present invention may also be configured such that each extension 5 extended through the associated hole 3 may be pressed against a wall of the hole 3, thus preventing the emblem 4 from becoming loose.

As shown in FIG. 6(b), opposite sides 5a of each extension 5A are bent in a slanted manner. The sides 5a are thus pressed against a wall of the hole 3, while an intermediate portion of the extension 5A is pressed against an opposite wall of the hole 3, as shown in FIG. 6(c).

As shown in FIG. 7, an extension 5B may include a projection 5b that projects from the extension 5B and extends rearward in a projecting direction of the extension 5B. The projection 5b, as shown in FIG. 7(b), abuts against a wall of the hole 3, and the remaining portion of the extension 5B abuts against an opposite wall of the hole 3.

Figure 8A:
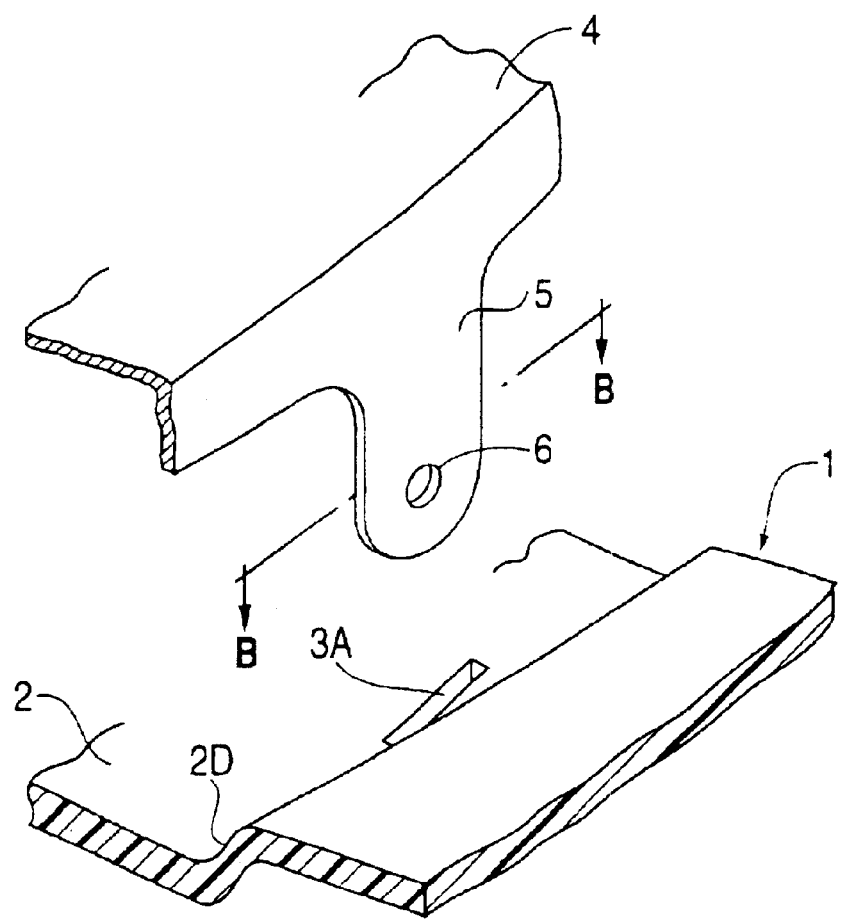
FIG. 8(*a*) is an exploded partial perspective view of an extension of an emblem and a cover according to an alternative embodiment of the present invention.
Figure 8B:
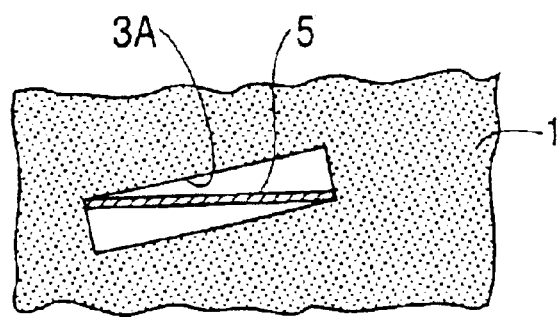

As shown in FIGS. 8(a) and 8(b), a hole 3A may be located slightly offset with respect to a side of the extension 5. More specifically, although the holes 3 of the aforementioned embodiments each extend along the wall 2D of the recess 2, the holes 3A of FIG. 8(a) each extend diagonally with respect to the direction in which the wall 2D extends. Thus, as shown in FIG. 8(b), an edge portion of the extension 5 abuts against a corner of the hole 3A, and an opposite edge portion of the extension 5 abuts against a diagonally opposing corner of the hole 3A. This structure secures the extension 5 in the hole 3A in a fixed manner.

Figure 9:
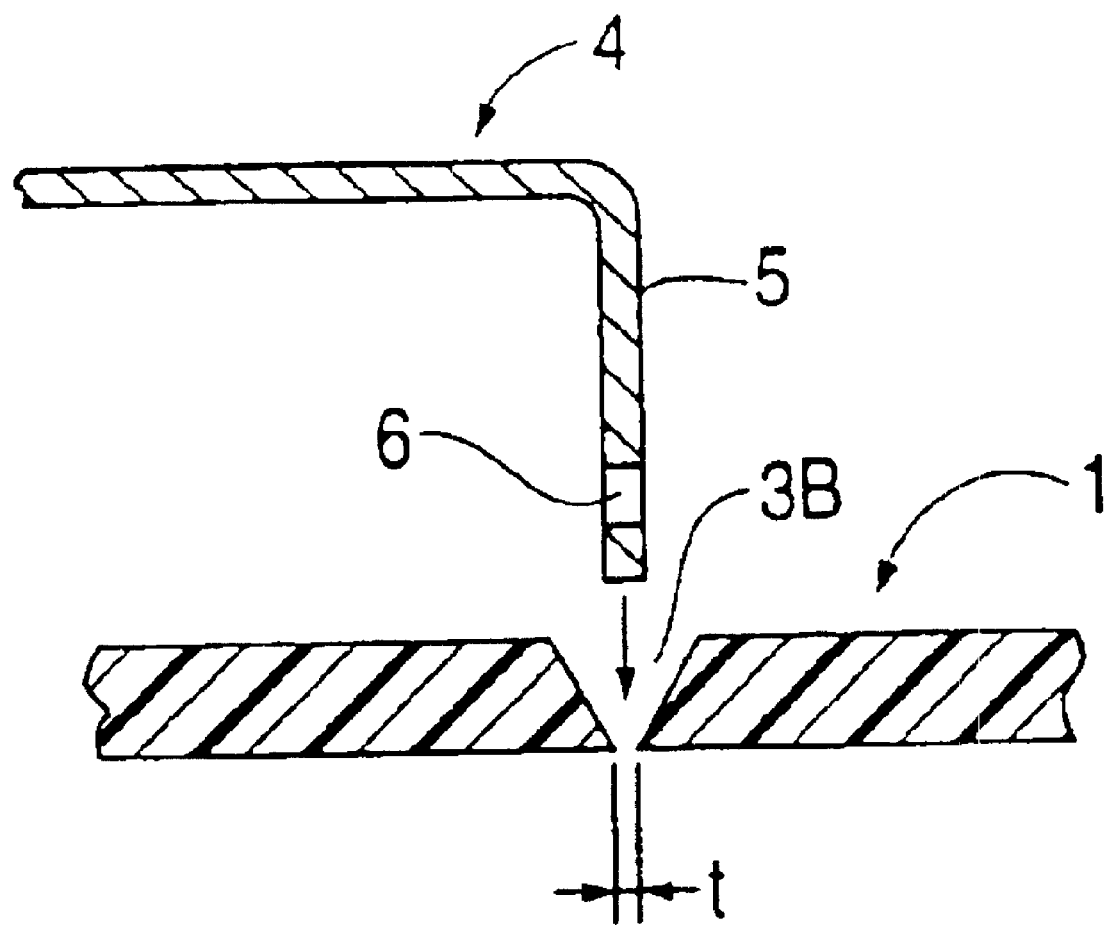
FIG. 9 is a cross-sectional view showing an extension of an emblem and a portion of the cover to which the emblem is attached according to another alternative embodiment of the present invention.

As shown in FIG. 9, a hole 3B has an opening area (a width in a thickness direction of the extension 5) decreasing toward a lower end of the hole 3B. An opening area t at the lower end of the hole 3B is smaller than the thickness of the extension 5. Thus, extension 5 fits firmly in the hole 3B.

Figure 10A:
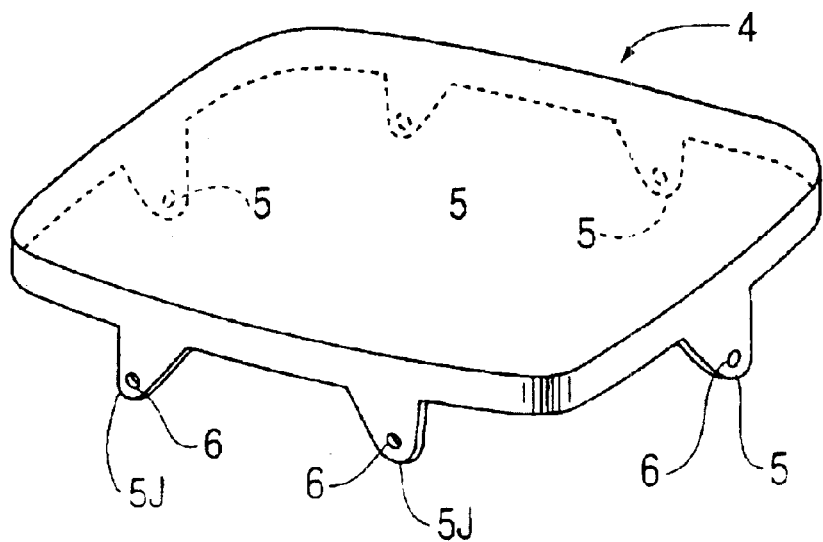
FIG. 10(*a*) is a perspective view of an emblem according to another embodiment of the present invention.
Figure 10B:
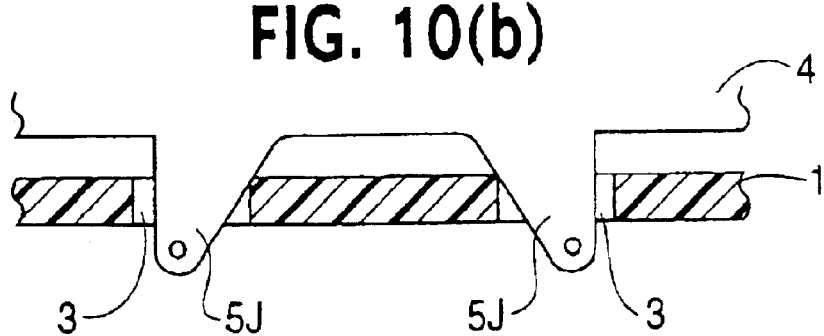

As shown in FIGS. 10(a) and 10(b), facing edge portions of adjacent extensions 5J extend diagonally such that the distance between the diagonal edge portions increases toward the distal ends of the extensions 5J. As shown in FIG. 10(b), when each extension 5J is extended through the associated hole 3, the diagonal edge portion of the extension 5J abuts against a longitudinal end wall of the hole 3 (the wall of the hole 3 against which the diagonal edge portion abuts is located closest to the adjacent hole 3). This structure prevents the extensions 5J from being displaced.

Figure 11:
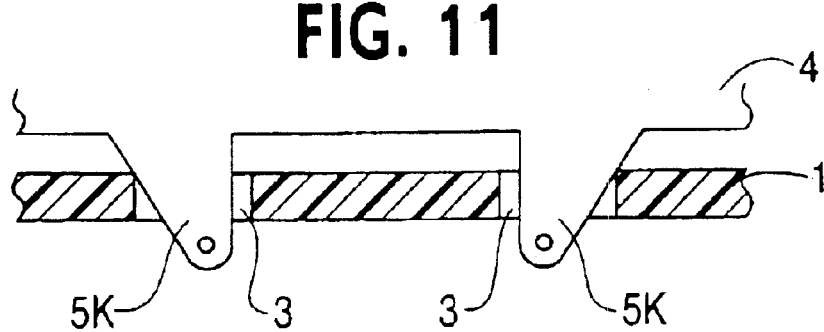
FIG. 11 is a cross-sectional view showing an emblem installed in a cover according to an alternative embodiment of the present invention.

Further, as shown in the alternative embodiment of FIG. 11, an edge portion of each extension 5K that opposes an edge portion of the extension 5K facing an adjacent extension 5K extends diagonally. The distance between the diagonal edge portions decreases toward the distal ends of the extensions 5K. Like the extensions 5J of FIGS. 10(a) and 10(b), when each extension 5K is extended through the associated hole 3, the diagonal edge portion of each extension 5K abuts against a longitudinal end wall of the associated hole 3 (the wall of the hole 3 against which the diagonal edge portion abuts is located farthest from the adjacent hole 3). This structure prevents the extensions 5K from being displaced.

Figure 12A:
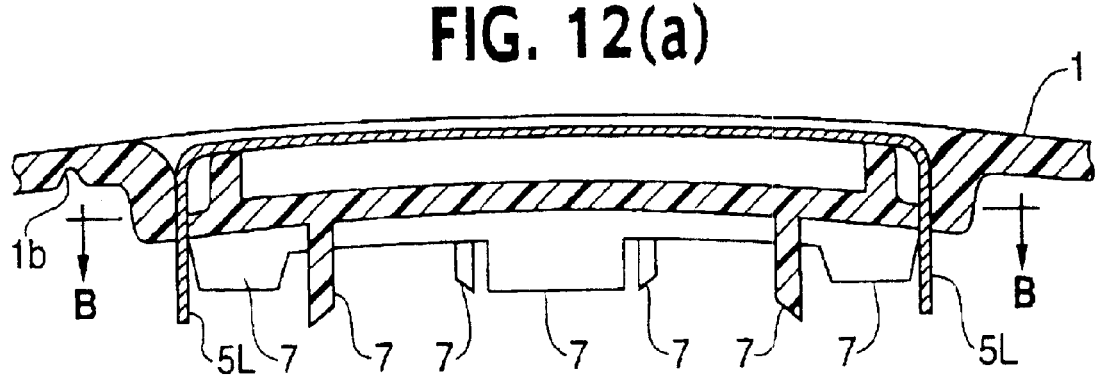
FIG. 12(a) is an cross-sectional view showing an emblem attached to a cover according to another embodiment of the present invention.
Figure 12B:
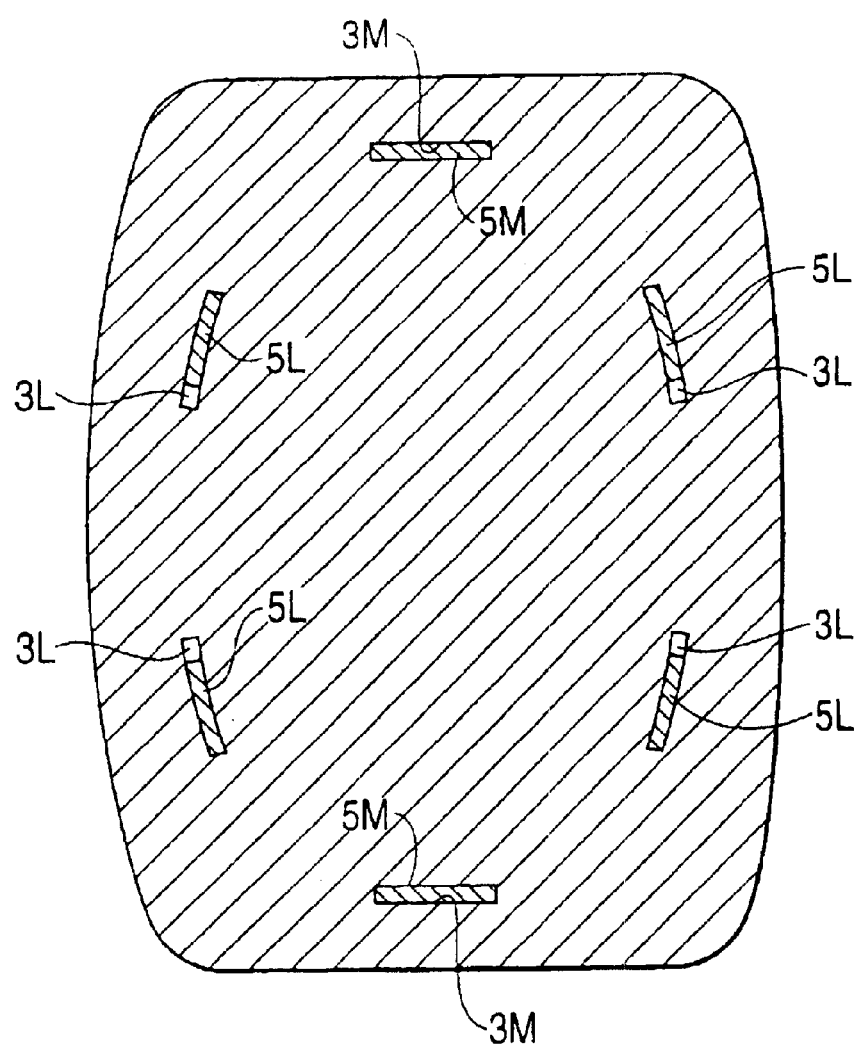
FIG. 12(b) is a cross-sectional view take along line B—B of 12(a).

As shown in FIGS. 12(a) and 12(b), each extension 5L abuts against a wall of a hole 3L (the wall against which the extension 5L abuts is located farthest from an adjacent hole 3L). This structure prevents the emblem from being displaced upward or downward, as viewed in FIG. 12(b). Alternatively, the extension 5L may abut against a wall of the hole 3L located closest to the adjacent hole 3L.

Further, since each extension 5M is securely fitted in a hole 3M, the emblem is prevented from being displaced rightward or leftward, as viewed in FIG. 12(b). That is, opposite ends of the extension 5M each abut against a longitudinal end wall of the associated hole 3M.

Figure 13A:
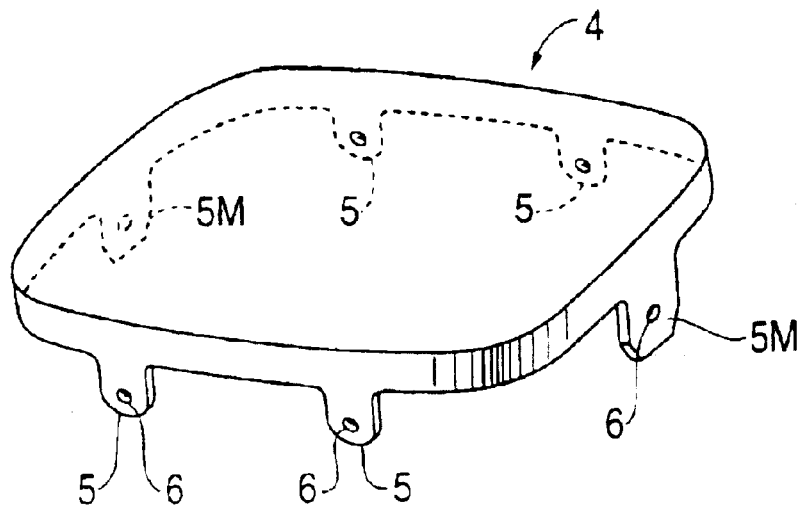
FIG. 13(a) a perspective view of an emblem according to another embodiment of the present invention.
Figure 13B:
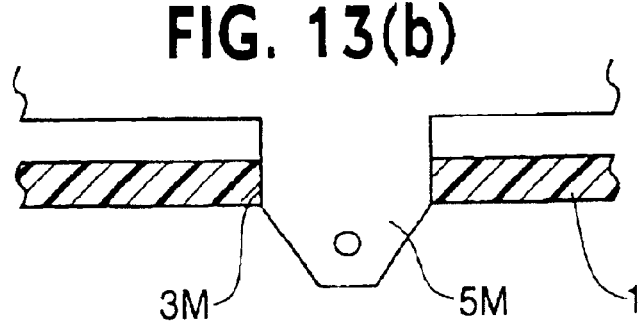
FIG. 13(b) is a partial cross-sectional view of the emblem of FIG. 13(a) showing a single extension installed in a cover.

In this case, as shown in FIG. 13, it is preferred that a distal end of each extension 5M is cornered. This enables the extension 5M to be smoothly extended through the associated hole 3M. Further, the extension 5M is securely fitted in the hole 3M when the extension 5M is deeply extended through the hole 3M.

Figure 14:
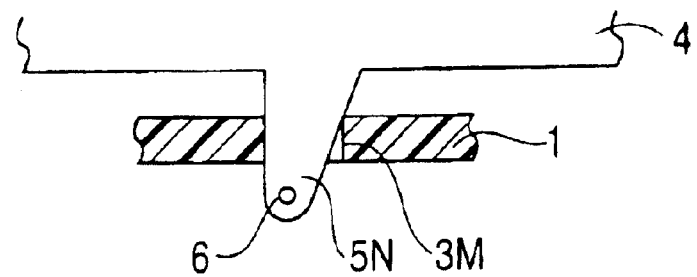
FIG. 14 is a partial cross-sectional view of the emblem of FIG. 13(a) showing a single extension installed in a cover.

In the extension 5M, both sides of the distal end is cut diagonally, as shown in FIG. 13. However, as shown in FIG. 14, only one side of a distal end of an extension 5N, which is extended through the hole 3M, may be cut diagonally.

It is preferred that the aforementioned structures for fitting the extensions securely in the holes are used for a circular emblem 4C, as shown in FIG. 15. The emblem 4C usually includes a mark representing a manufacturer or model name (in FIG. 15, the mark is "A"). When the mark includes letters like in this case, it is necessary to attach the emblem accurately on the cover such that the mark is oriented correctly. In this case, the emblem 4 may include the extensions 5M having an increased basal dimension $W_1$ and the extensions 5L having a decreased basal dimension $W_2$. Further, the cover includes enlarged holes (holes having an increased longitudinal dimension) in which only the enlarged extensions 5M are securely fitted. This structure enables the emblem 4 to be positioned accurately.

Figure 15A:
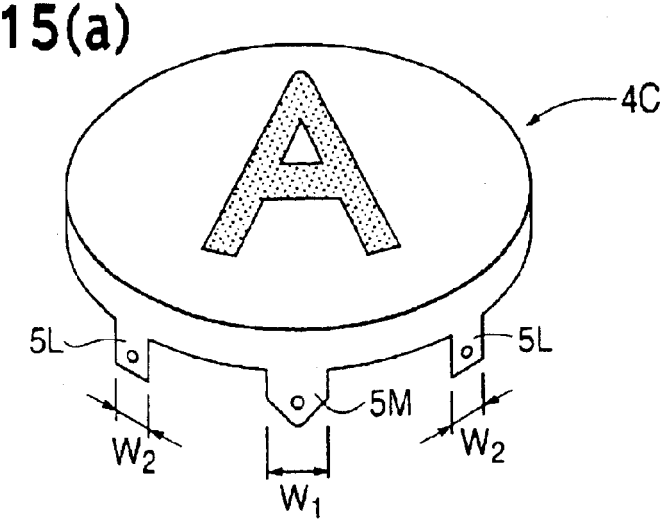
FIG. 15(a) is a perspective view of a circular emblem according to an alternative embodiment of the present invention.
Figure 15B:
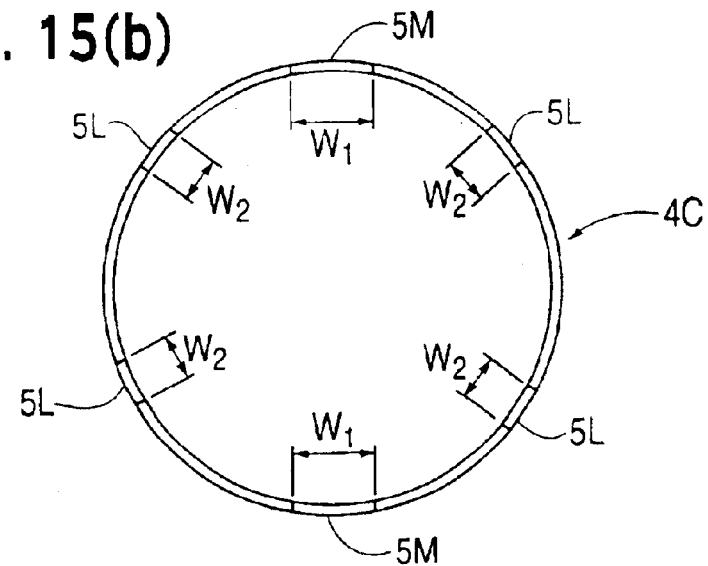
FIG. 15(b) is bottom plan view of the circular emblem of FIG. 15(b).
Figure 16:
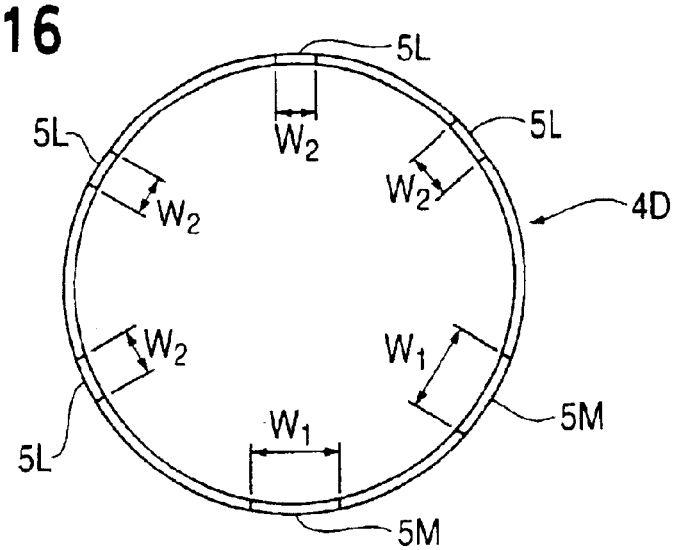
FIG. 16 is a bottom plan view showing a circular emblem according to an alternative embodiment of the present invention.

If the two enlarged extensions 5M radially oppose each other as shown in FIGS. 15(a) and 15(b), the emblem 4C could be positioned with respect to the cover possibly in a reversed manner. However, if the two enlarged extensions 5M are located adjacent to each other, like an emblem 4D shown in FIG. 16, the emblem 4D is reliably attached to the cover in an accurate orientation. Although not illustrated, an extension 52 having a decreased basal dimension may be located between the two enlarged extensions 5M.

Figure 17:
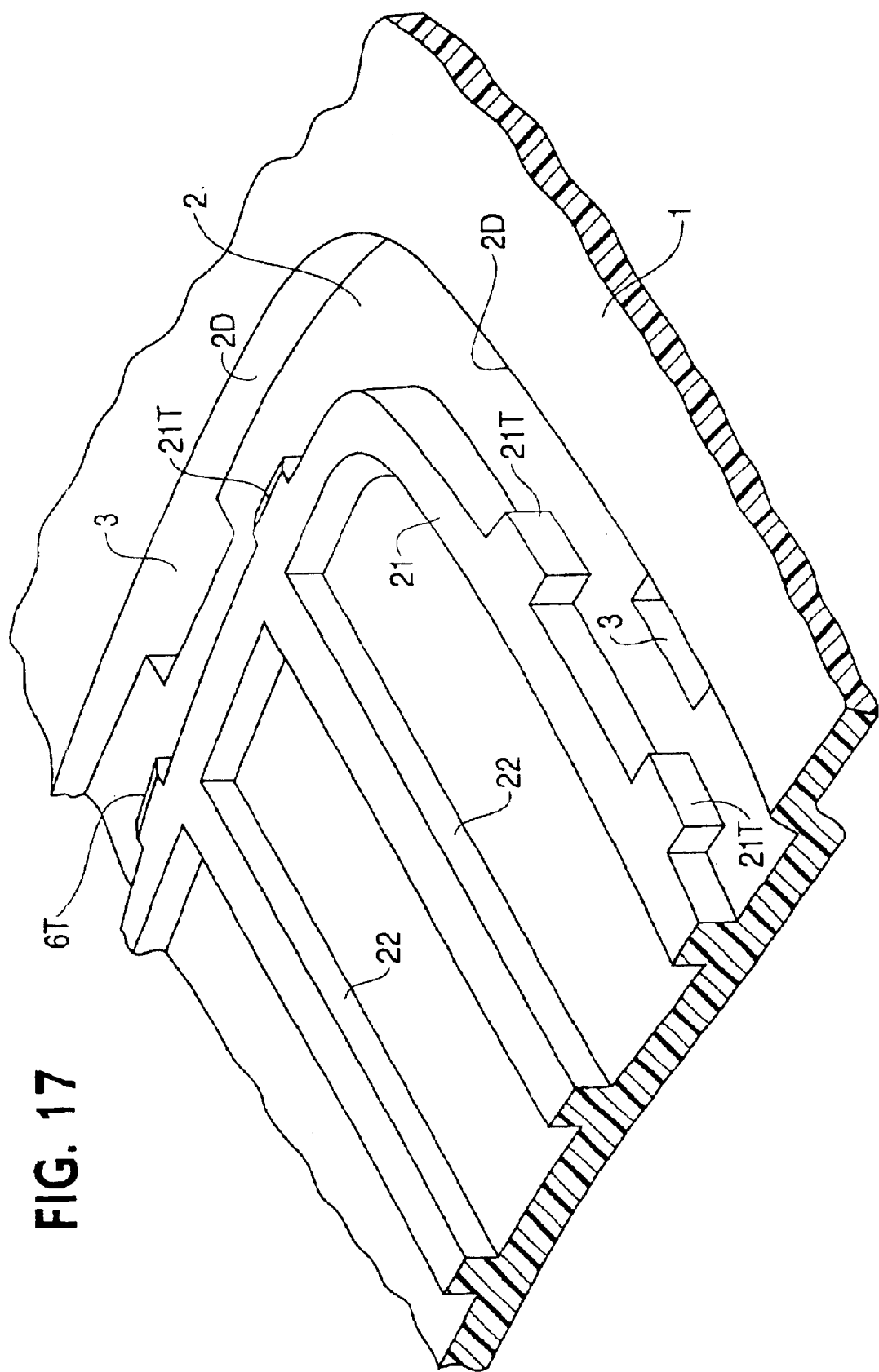
FIG. 17 is a partial perspective view showing a projection for a cover according to an alternative embodiment of the present invention.

Further, in the present invention, a plurality of supports 21T may be formed along the frame 21 of the projection 20, as shown in FIG. 17. The supports 21T support a portion from which the extensions 5 project (as indicated by the reference numeral 5W in FIG. 2). This prevents the portion 5W from being bent together with the extensions 5, when the distal ends of the extensions 5 are bent with respect to the holes 3.

Also, the present invention may include a structure preventing the extensions 5 from separating from the holes 3. FIGS. 18 to 26 disclose various examples of this structure.

Figure 18A:
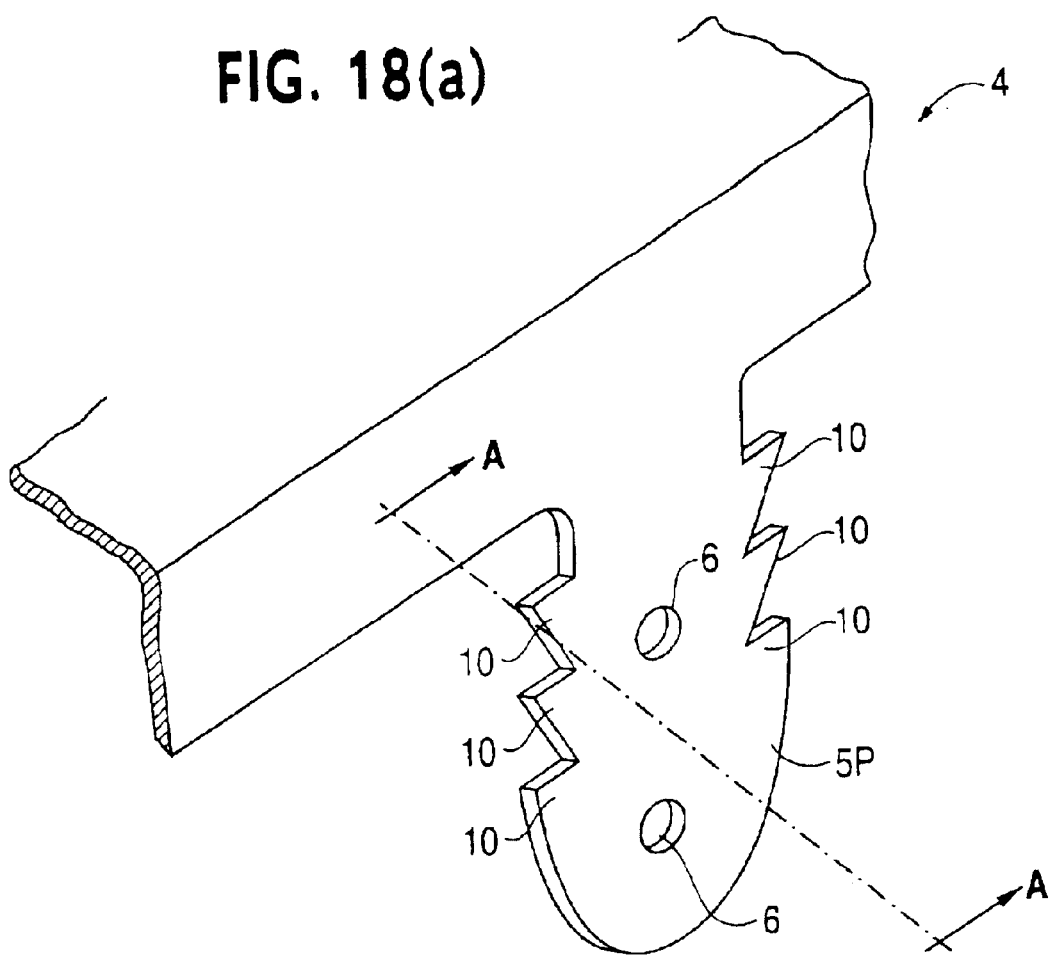
FIG. 18(a) is a perspective view showing an extension of an emblem according to an alternative embodiment of the present invention.
Figure 18B:
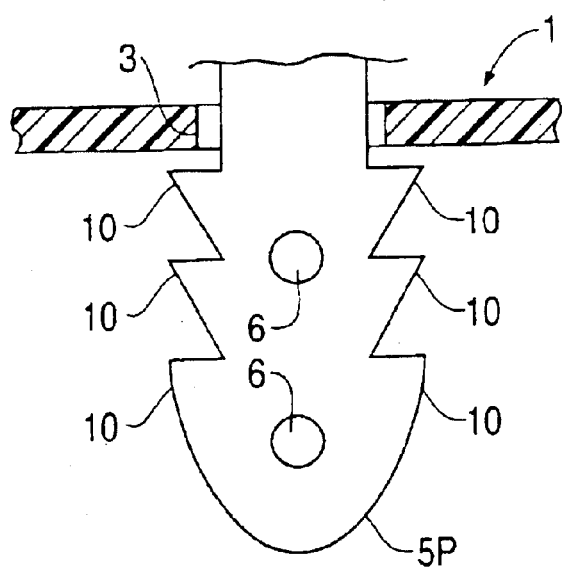
FIG. 18(b) is a front plan view of the extension of FIG. 18(a) showing the emblem installed in a cover.
Figure 18C:
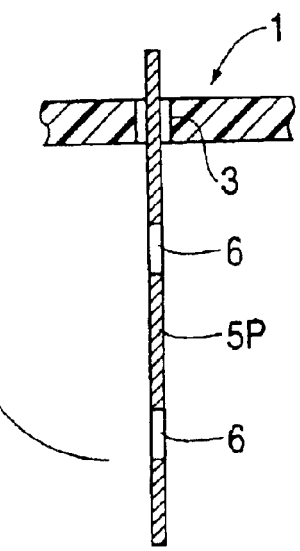
FIG. 18(c) is a cross-sectional view of the emblem of FIG. 18(a) taken through line A—A.

As shown in FIGS. 18(a) and 18(b), a plurality of tooth-like projections 10 project from opposite sides of an extension 5P. When the extension 5P is extended through the hole 3, the projections 10 is stopped by a rear edge of the wall of the hole 3. This stops the extension 5P from being separated from the hole 3. The extension 5P is then bent as indicated by the arrow in FIG. 18(c), and is welded as necessary, as aforementioned. Instead of welding, a pin may be provided on the rear side of the cover 1, and the pin is fitted in a hole 6 of the extension 5P.

Figure 19:
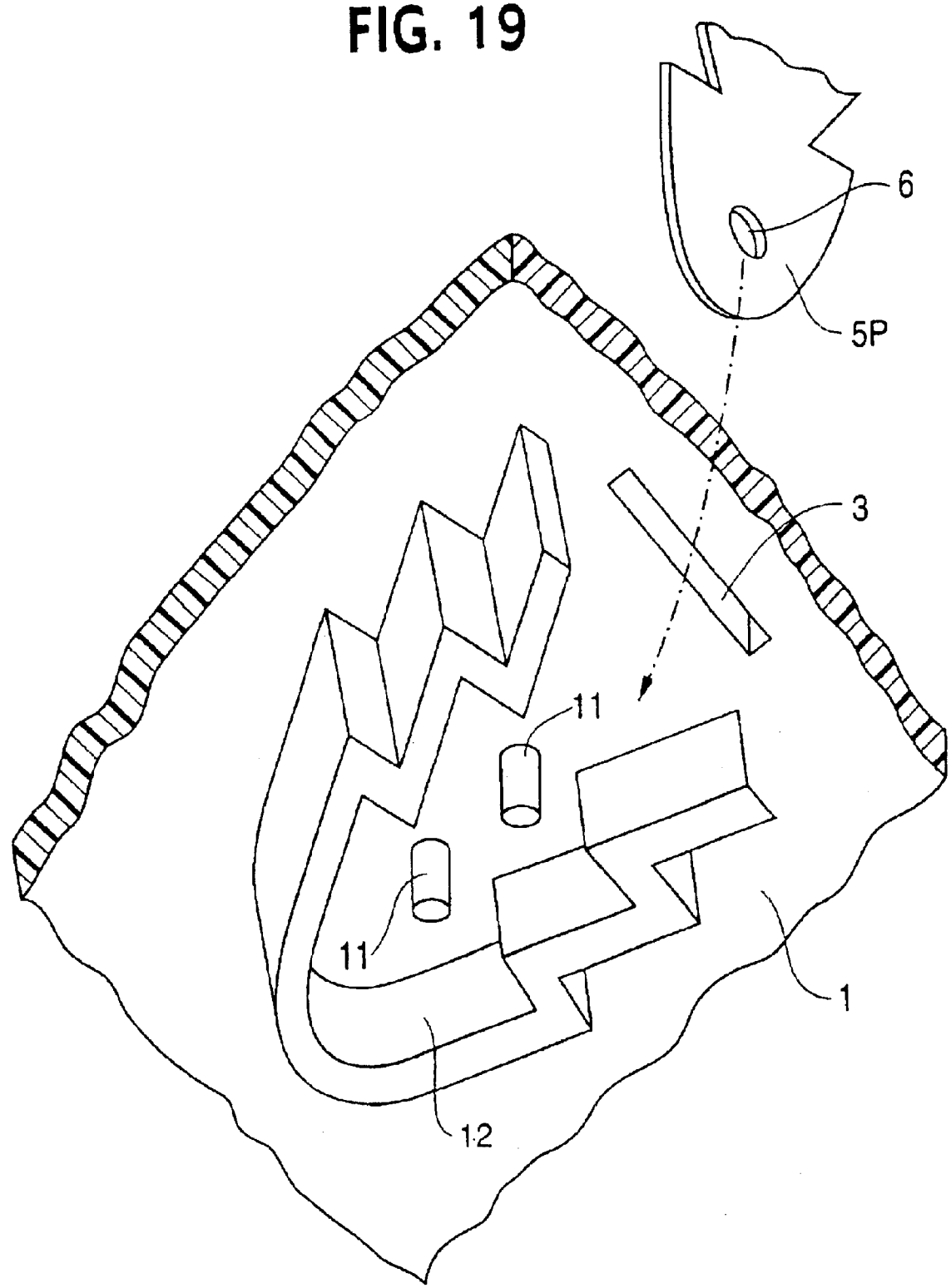
FIG. 19 is an exploded perspective view showing the extension of FIG. 18(a) and the rear side of the cover.

FIG. 19 is a perspective view showing the rear side of the cover 1 including pins 11. In this embodiment, a rib 12 is located around the pins 11. The rib 12 defines a recess sized and shaped to match the extension 5P. The extension 5P is bent such that the pins 11 are extended through the holes 6 of the rib 12. Afterwards, the rib 12 and the pins 11 are welded to firmly secure the extension 5P.

Figure 20A:
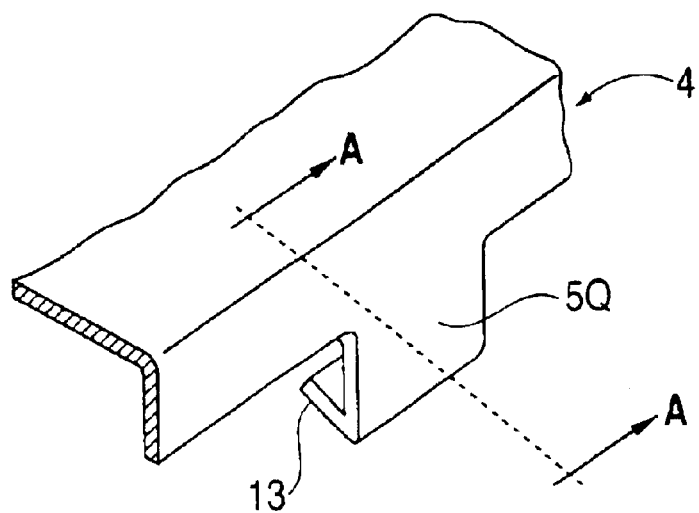
FIG. 20(a) is a perspective view showing an extension of an emblem according to an alternative embodiment of the present invention.
Figure 20B:
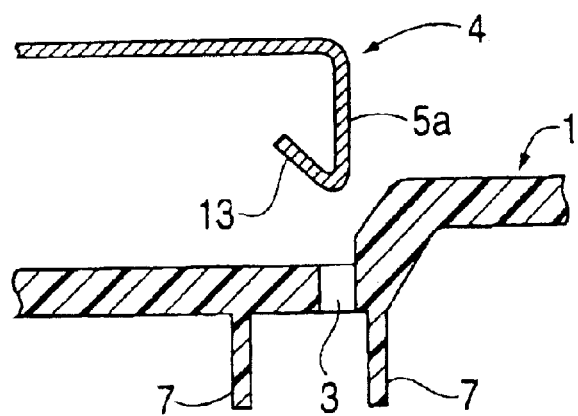
FIGS. 20(b) and 20(c) are cross-sectional views of the extension of FIG. 20(a) taken through line A—A, showing the procedure for securing the extension to the cover.
Figure 20C:
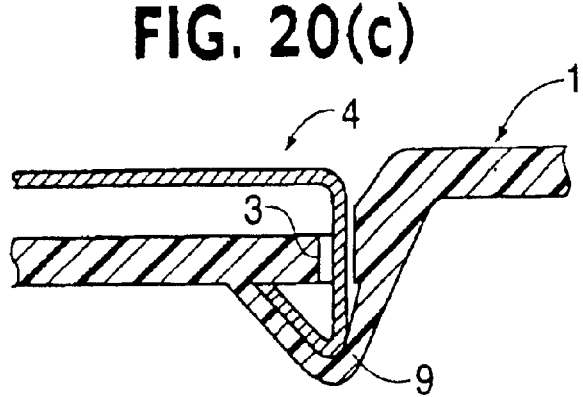

As shown in FIGS. 20(a) and 20(b), an extension 5Q includes a bent portion 13 to form an L shape together with the extension 5Q. When the extension 5Q is extended through the hole 3, the bent portion 13 is elastically deformed. After being fit into the hole 3, the bent portion 13 returns to its original shape. As shown in FIG. 20(c), the associated ribs 7 may be welded to form a welding body 9 that firmly secures the emblem 4 to the cover 1.

Figure 21A:
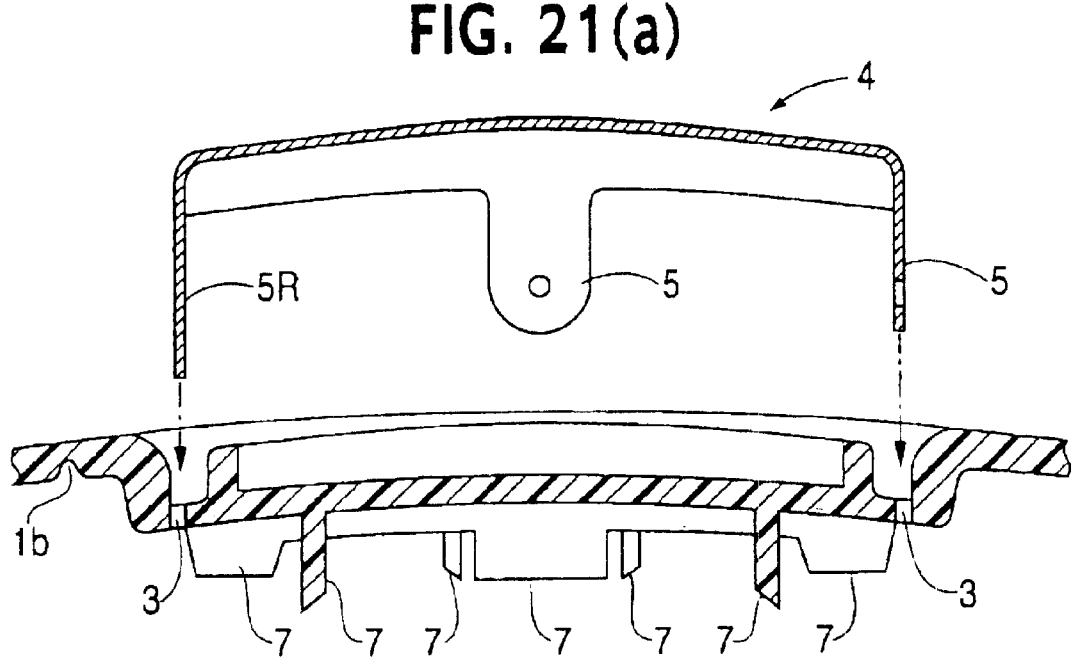
FIG. 21(a) is a cross-sectional view of an emblem and cover according to an alternative embodiment of the present invention.
Figure 21B:
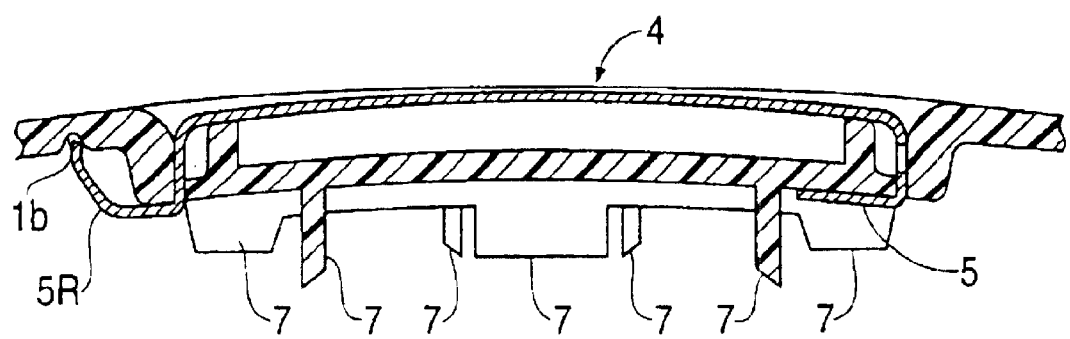
FIG. 21(b) is a cross-sectional view of the emblem and cover of FIG. 21(a) showing the emblem secured to the cover.

As shown in FIGS. 21(a) and 21(b), the emblem 4 may have an extension 5R that is bent outward with respect to the emblem 4. A distal end of the extension 5R is engaged with a tearing line 1b. The remaining extensions 5 are bent inward with respect to the middle of the emblem 4, like the aforementioned embodiments. The ribs 7 are then subjected to welding.

Figure 22A:
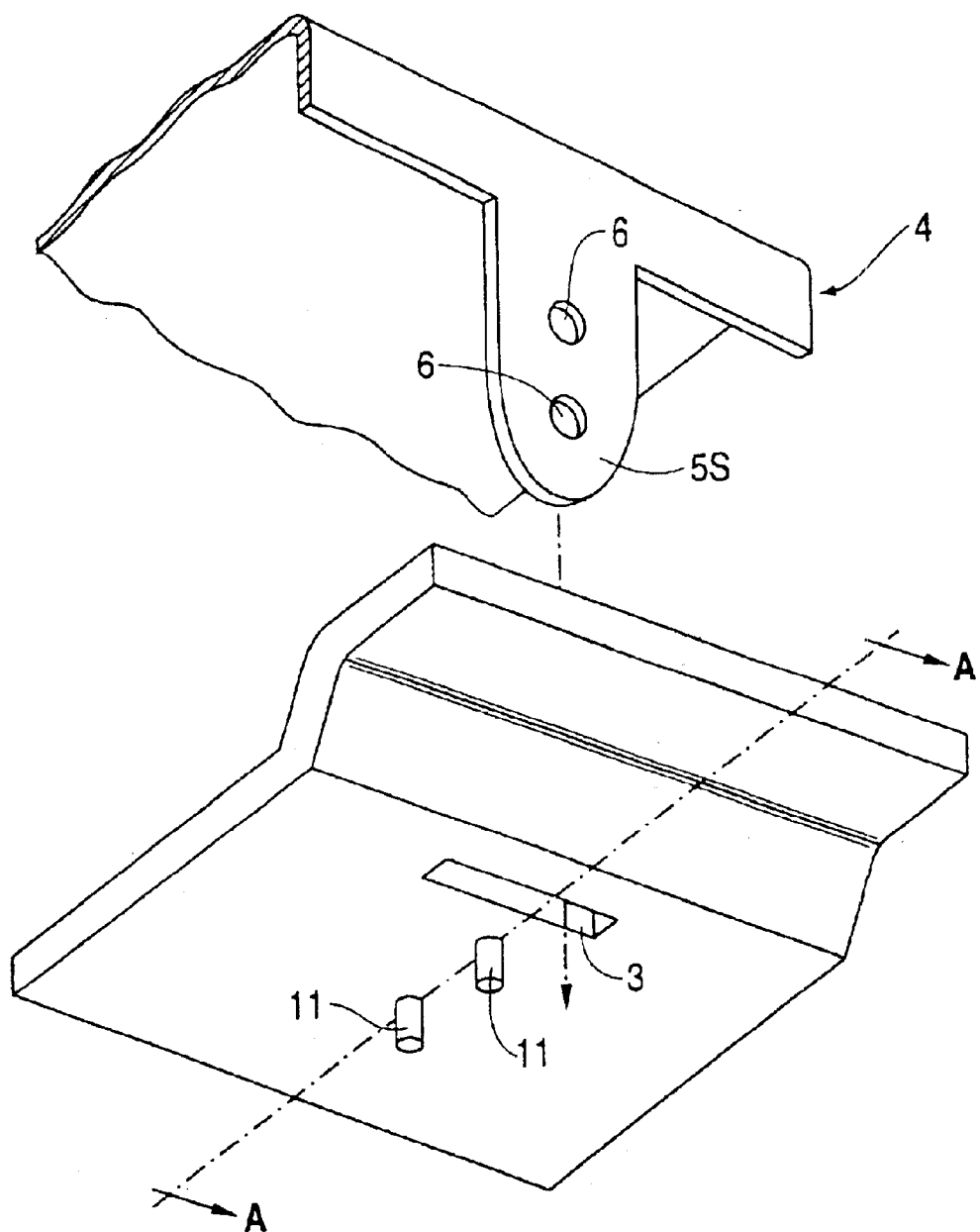
FIG. 22(a) is an exploded partial perspective view of an emblem and cover showing an extension according to an alternative embodiment of the present invention.
Figure 22B:
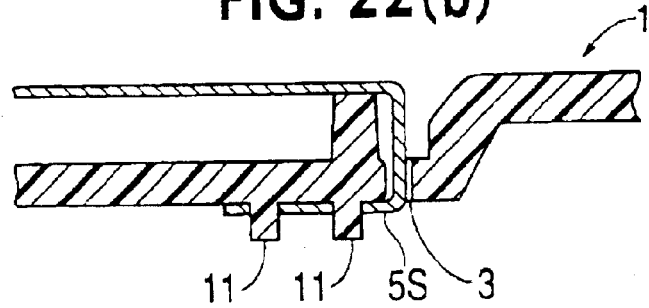
FIG. 22(b) is a cross-sectional view of the extension and cover of FIG. 22(a) taken through line A—A.

As shown in FIGS. 22(a) and 22(b), an extension 5S is first extended through the hole 3. A distal end of the extension 5S is then bent so that the pins 11 of the cover 1 are positioned through the holes 6 of the extension 5S thereby securing the extension 5S to the cover 1.

Figure 23:
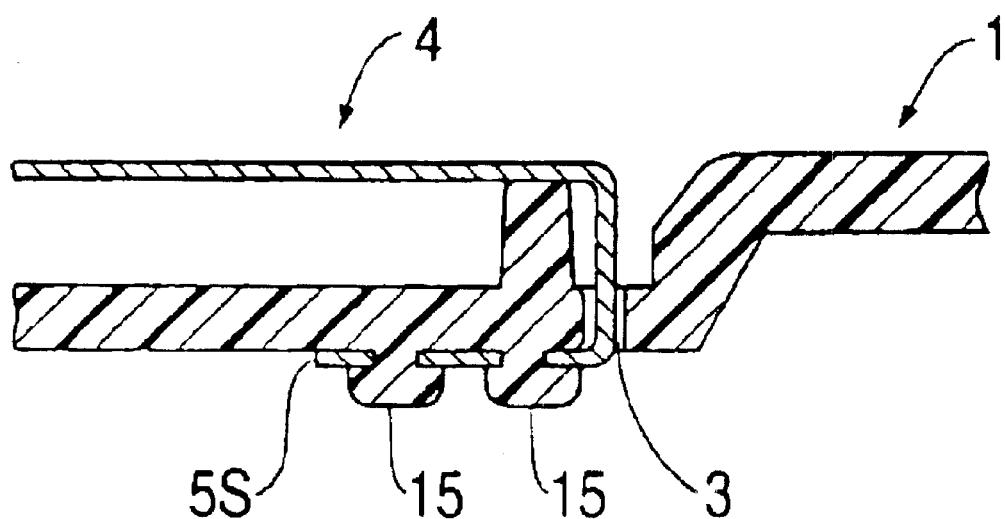
FIG. 23 is a cross-sectional view of the cover of FIG. 22(a) showing an alternative embodiment of an extension according to the present invention.
Figure 24:
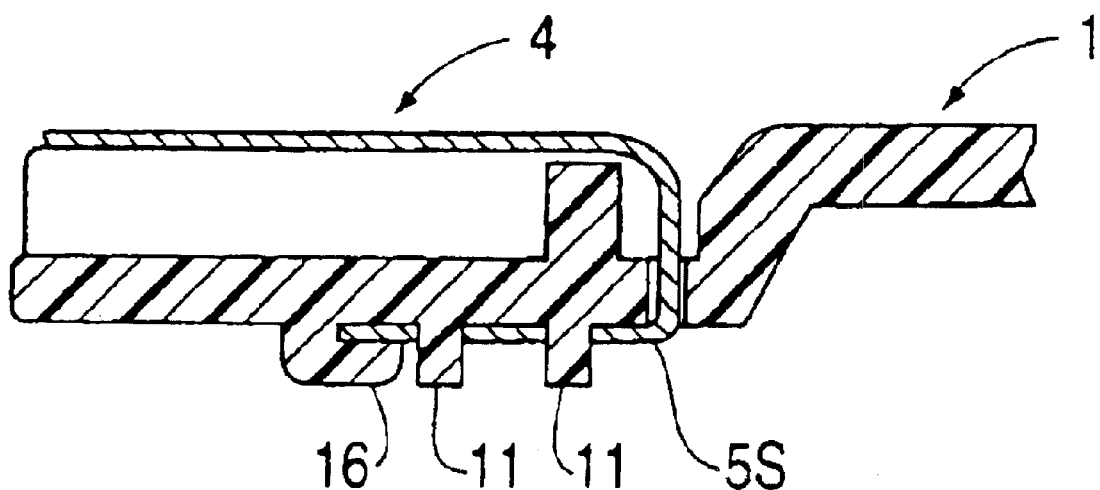
FIG. 24 is a cross-sectional view of the cover of FIG. 22(a) showing an alternative embodiment of an extension according to the present invention.

In this case, the pins 11 are generally not welded. However, each pin 11 may be welded to form a welding body 15, as shown in FIG. 23. Further, as shown in FIG. 24, a rib may be provided in the vicinity of a pin 11. The rib is welded to form a welding body 16. The extension 5S is thus secured by the rib and the pin 11. In addition, the extension 5S may be secured by both the welding body 15 of FIG. 23 and the welding body 16 of FIG. 24.

Figure 25A:
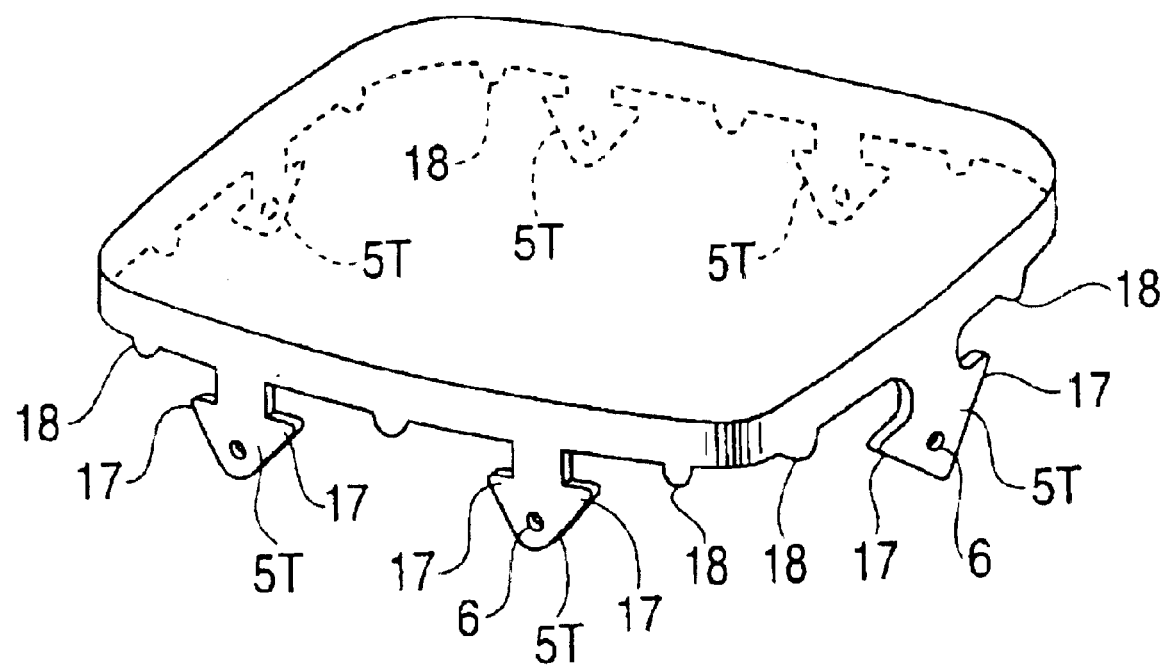
FIG. 25(a) is a perspective view of an emblem according to another embodiment of the present invention.
Figure 25B:
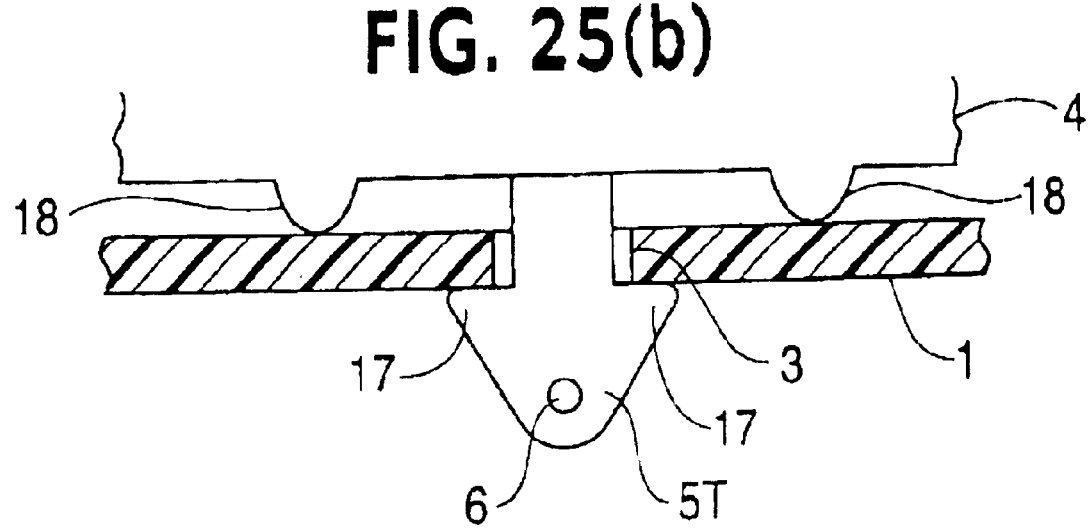
FIG. 25(b) is a partial cross-sectional view showing the emblem of FIG. 25(a) installed in a cover.

As shown in FIGS. 25(a) and 25(b), an extension 5T of the present invention may include extended portions 17. When the extension 5T is extended through the hole 3, each extended portion 17 is stopped by the rear edge of the wall of the hole 3. Further, projected portions 18 may extend from an end of the emblem 4 in the same direction as the direction in which each extension 5T extends.

The projected portions 18 abut against the front side of the cover 1, while the extended portions 17 abut against the rear side of the cover 1. This structure prevents the emblem 4 from moving (becoming loose) upward or downward as viewed in FIG. 25(b). Further, a distal end of each projected portion 18 may be embedded in the cover 1.

Figure 26A:
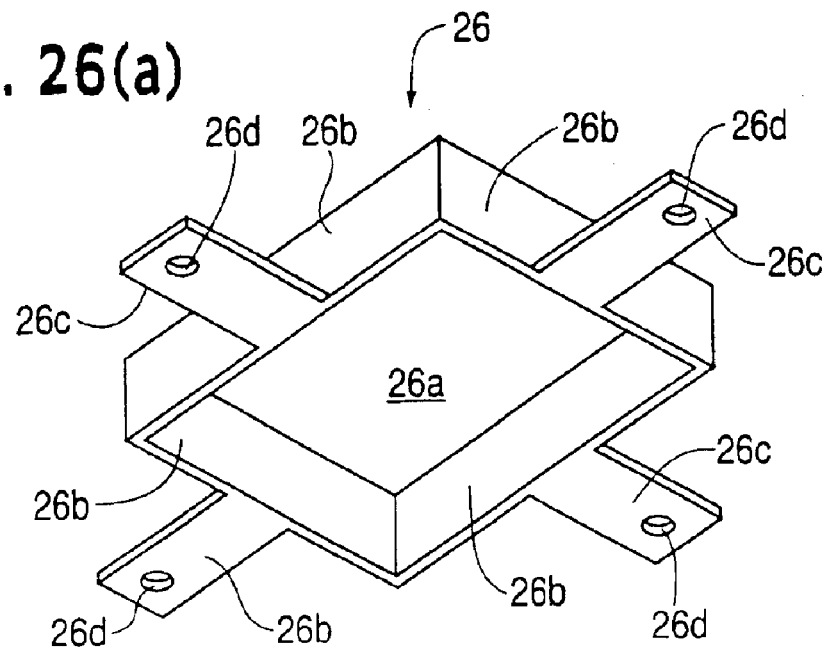
FIG. 26(a) is a perspective view of an emblem according to another embodiment of the present invention.

As shown in FIG. 26(a), an emblem 26 includes a main plate 26a, walls 26b extending downward from a periphery of the main plate 26a, and tabs 26c each extending from a distal end of the associated wall 26b. Each tab 26c extends substantially parallel with the main plate 26a and outward with respect to the emblem 26. A hole 26d extends through the tab 26c. An opening 31 is formed in a cover 30 for receiving the main plate 26a of the emblem 26. Grooves 32 are formed in a rear side of the cover 30 and extend from the opening 31 in four directions. A pin 33 is formed in the wall of each groove 32. A rib 34 extends along the groove 32.

Figure 26B:
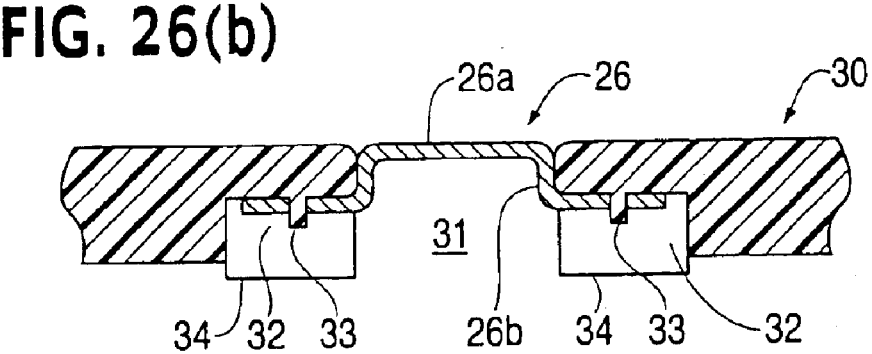
FIG. 26(b) is a partial cross-sectional view showing the emblem of FIG. 26(a) installed in a cover.
Figure 26C:
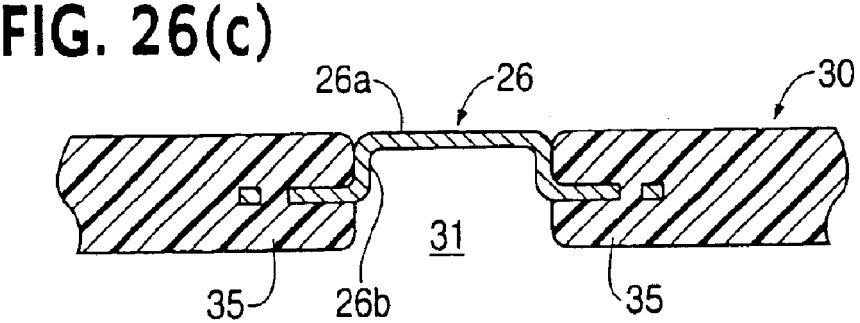
FIG. 26(c) is a cross-sectional view showing the emblem of FIG. 26(a) welded to the cover.

To attach the emblem 26 on the cover 30, the main plate 26a is fitted in the opening 31 from the rear side of the cover 30, as shown in FIG. 26(b). The tabs 26c are then fitted in the associated grooves 32 such that each pin 33 is extended through the associated hole 26d. Subsequently, as shown in FIG. 26(c), each pin 33 and each rib 34 are welded to form a welding body 35 that covers each tab 26c. The emblem 26 is thus secured to the cover 30. According to the procedure shown in FIG. 26, the cover 30 having the emblem 26 is manufactured in a relatively simple manner, as compared to a procedure in which the emblem 26 is inserted in the cover 30 during a molding process. Further, if the emblem 26 is inserted in the cover 30 during a molding process, the emblem 26 is first placed in a metal mold. Resin, or the material of the cover 30, is then injected in the mold to form the cover 30.

We claim:

1. A cover for an air bag device comprising:
    an emblem attached to an outer side of the cover, the emblem including;
    a main plate arranged to the outer side of the cover;
    a connecting extension projecting from an outer periphery of the main plate in a rearward direction of the emblem;
    wherein the extension extends through a hole in the cover and includes a distal end that is bent; and
    a covering portion welded to a rear side of the cover to form an integral welded body that covers the bent distal end of the extension.

2. The cover of claim 1, wherein the distal end of the extension includes a hole.

3. The cover of claim 2, wherein the welded body is located in the hole.

4. The cover of claim 1, wherein the extension is completely surrounded by the welded body cover.

5. A cover for an airbag module comprising:
    an emblem including a main plate and a plurality of extensions;
    wherein the main plate is positioned over the front side of the cover and the extensions are secured to the rear side of the cover by a welded body that completely surrounds the extensions.

6. The cover of claim 5, wherein the extensions pass through a hole in the cover.

7. The cover of claim 6, wherein the extensions include a distal end that is bent into a position parallel to the main plate.

8. A cover for an airbag module comprising:
    an emblem including a main plate and a plurality of extensions;
    wherein the main plate is positioned over the front side of the cover and the extensions are completely surrounded by a rib portion of located on the rear side of the cover;
    wherein the rib portions are welded to the cover to form an integral welded body with the cover that surrounds the extensions after the emblem is positioned with the main plate overlying the front side of the cover.

9. A cover for an air bag device comprising:
    an emblem attached to an outer side of the cover, the emblem including:
    a main plate arranged to the outer side of the cover;
    a connecting extension projecting from an outer periphery of the main late in a rearward direction of the emblem;
    wherein the extension extends through a hole in the cover and includes a distal end that is bent, wherein the distal end includes a hole; and
    a covering portion welded to a rear side of the cover to form an integer welded body that covers the bent distal end of the extension wherein the welded body is located in the hole.

* * * * *